US012734648B2

(12) United States Patent
Ito et al.

(10) Patent No.: US 12,734,648 B2
(45) Date of Patent: Sep. 15, 2026

(54) SCREWING TOOL

(71) Applicant: MAKITA CORPORATION, Anjo (JP)

(72) Inventors: Miyabi Ito, Anjo (JP); Akihiro Hara, Anjo (JP); Makoto Chikaraishi, Anjo (JP)

(73) Assignee: MAKITA CORPORATION, Anjo (JP)

(*) Notice: Subject to any disclaimer, the term of this patent is extended or adjusted under 35 U.S.C. 154(b) by 350 days.

(21) Appl. No.: 18/633,718

(22) Filed: Apr. 12, 2024

(65) Prior Publication Data

US 2025/0001561 A1 Jan. 2, 2025

(30) Foreign Application Priority Data

Jun. 29, 2023 (JP) ................................ 2023-107256

(51) Int. Cl.

| | |
|---|---|
| ***B25B 21/00*** | (2006.01) |
| ***B25B 23/147*** | (2006.01) |
| ***B25B 23/18*** | (2006.01) |
| ***F21V 5/04*** | (2006.01) |

(52) U.S. Cl.

CPC ............ *B25B 21/00* (2013.01); *B25B 23/147* (2013.01); *B25B 23/18* (2013.01); *F21V 5/043* (2013.01)

(58) Field of Classification Search

CPC ....... B25B 21/00; B25B 23/147; B25B 23/18; B25B 23/00; F21V 5/043

See application file for complete search history.

(56) References Cited

U.S. PATENT DOCUMENTS

| | | | | |
|---|---|---|---|---|
| 2006/0262519 | A1* | 11/2006 | Hirschburger | B25F 5/021 362/119 |
| 2013/0148335 | A1* | 6/2013 | Miyazawa | B25F 5/021 362/119 |
| 2020/0310076 | A1* | 10/2020 | Oguchi | G01C 15/004 |
| 2021/0088210 | A1* | 3/2021 | Purdy | F21V 33/0084 |
| 2022/0297281 | A1* | 9/2022 | Valentini | B25F 5/021 |
| 2023/0366535 | A1* | 11/2023 | Chikaraishi | B25F 5/001 |

FOREIGN PATENT DOCUMENTS

| | | | |
|---|---|---|---|
| JP | 2020-044627 | A1 | 3/2020 |

* cited by examiner

*Primary Examiner* — Evan P Dzierzynski
(74) *Attorney, Agent, or Firm* — Oliff PLC

(57) ABSTRACT

An indication light emitter has higher viewability. A screwing tool includes a motor, a tool holder rotatable with a rotational force generated by the motor, a cylindrical lens between the motor and the tool holder, and a light-emitting element located radially outward from the cylindrical lens to illuminate the cylindrical lens.

20 Claims, 34 Drawing Sheets

SCREWING TOOL

CROSS-REFERENCE TO RELATED APPLICATIONS

This application claims the benefit of priority to Japanese Patent Application No. 2023-107256, filed on Jun. 29, 2023, the entire contents of which are hereby incorporated by reference.

BACKGROUND

1. Technical Field

The disclosure relates to a screwing tool.

2. Description of the Background

A known screwing tool in the technical field of screwing tools is described in Japanese Unexamined Patent Application Publication No. 2020-044627 (hereafter, Patent Literature 1).

BRIEF SUMMARY

The screwing tool described in Patent Literature 1 includes an indication light emitter. The indication light emitter is to have higher viewability.

One or more aspects of the disclosure are directed to an indication light emitter with higher viewability.

A first aspect of the disclosure provides a screwing tool, including:

- a motor;
- a tool holder rotatable with a rotational force generated by the motor;
- a cylindrical lens between the motor and the tool holder; and
- a light-emitting element located radially outward from the cylindrical lens and configured to illuminate the cylindrical lens.

The indication light emitter according to the above aspect of the disclosure has higher viewability.

DETAILED DESCRIPTION

Although one or more embodiments will now be described with reference to the drawings, the disclosure is not limited to these embodiments. The components in the embodiments described below may be combined as appropriate. One or more components may be eliminated.

In the embodiments, the positional relationships between the components will be described using the directional terms such as right and left (or lateral), front and rear, and up and down (or vertical). The terms indicate relative positions or directions with respect to the center of an electric work machine. The lateral direction, the front-rear direction, and the vertical direction are perpendicular to one another.

The electric work machine includes a motor. In the embodiments, a direction parallel to a rotation axis AX of the motor is referred to as an axial direction for convenience. A direction radial from the rotation axis AX of the motor is referred to as a radial direction or radially for convenience. A direction about the rotation axis AX of the motor is referred to as a circumferential direction, circumferentially, or a rotation direction for convenience.

A position in one axial direction, or one axial direction, is referred to as a first axial direction for convenience. A position in the other axial direction, or the other axial direction, is referred to as a second axial direction for convenience. In the embodiments, the axial direction and the front-rear direction are parallel to each other. The first axial direction is from the rear to the front, and the second axial direction is from the front to the rear.

A position nearer the rotation axis AX of the motor in the radial direction, or a radial direction toward the rotation axis AX, is referred to as radially inward for convenience. A position farther from the rotation axis AX of the motor in the radial direction, or a radial direction away from the rotation axis AX, is referred to as radially outside or radially outward for convenience.

A position in one circumferential direction, or one circumferential direction, is referred to as a first circumferential direction for convenience. A position in the other circumferential direction, or the other circumferential direction, is referred to as a second circumferential direction for convenience.

First Embodiment

Electric Work Machine

Figure 1:
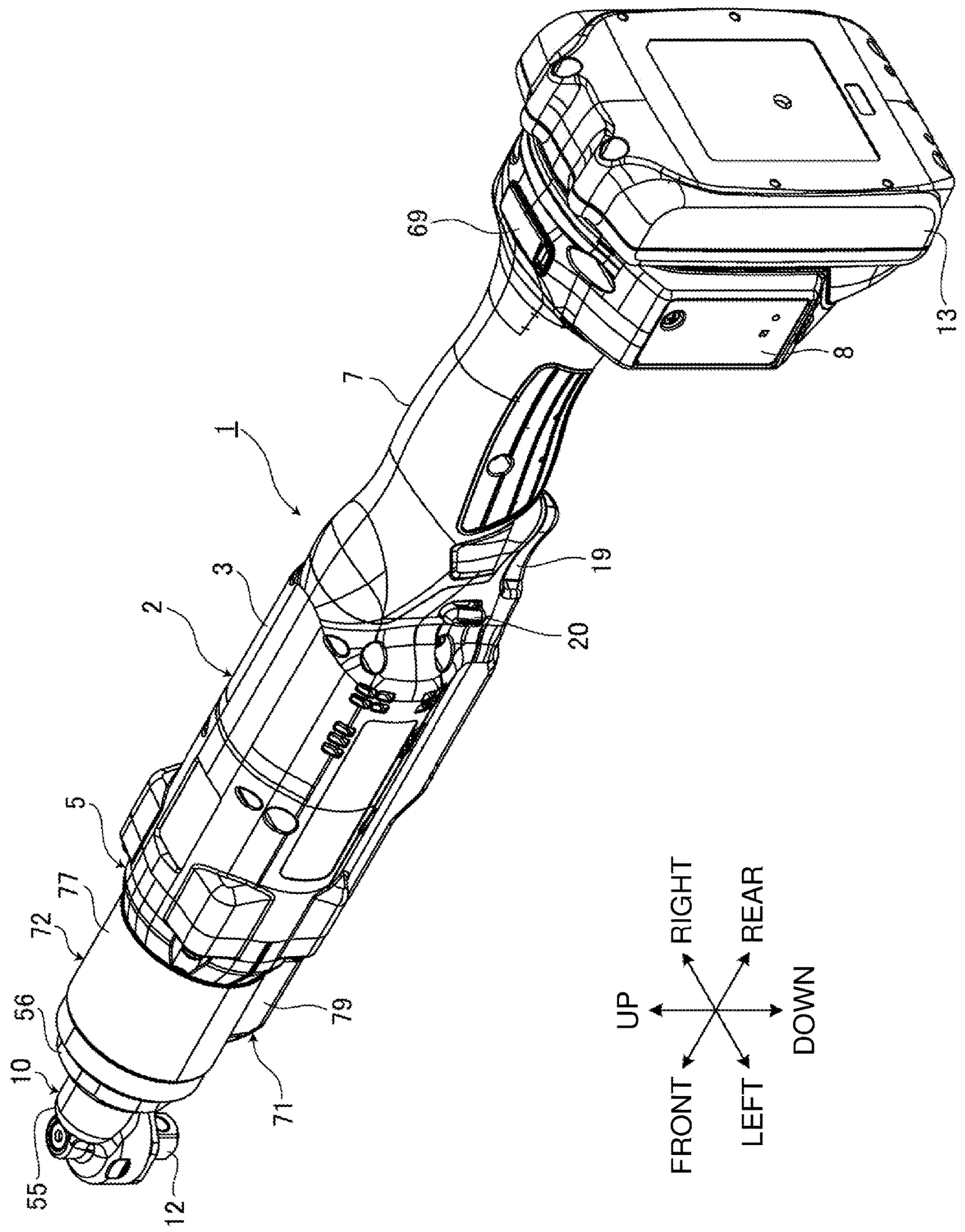
FIG. 1 is a perspective view of an electric work machine according to a first embodiment as viewed from the upper left rear.
Figure 2:
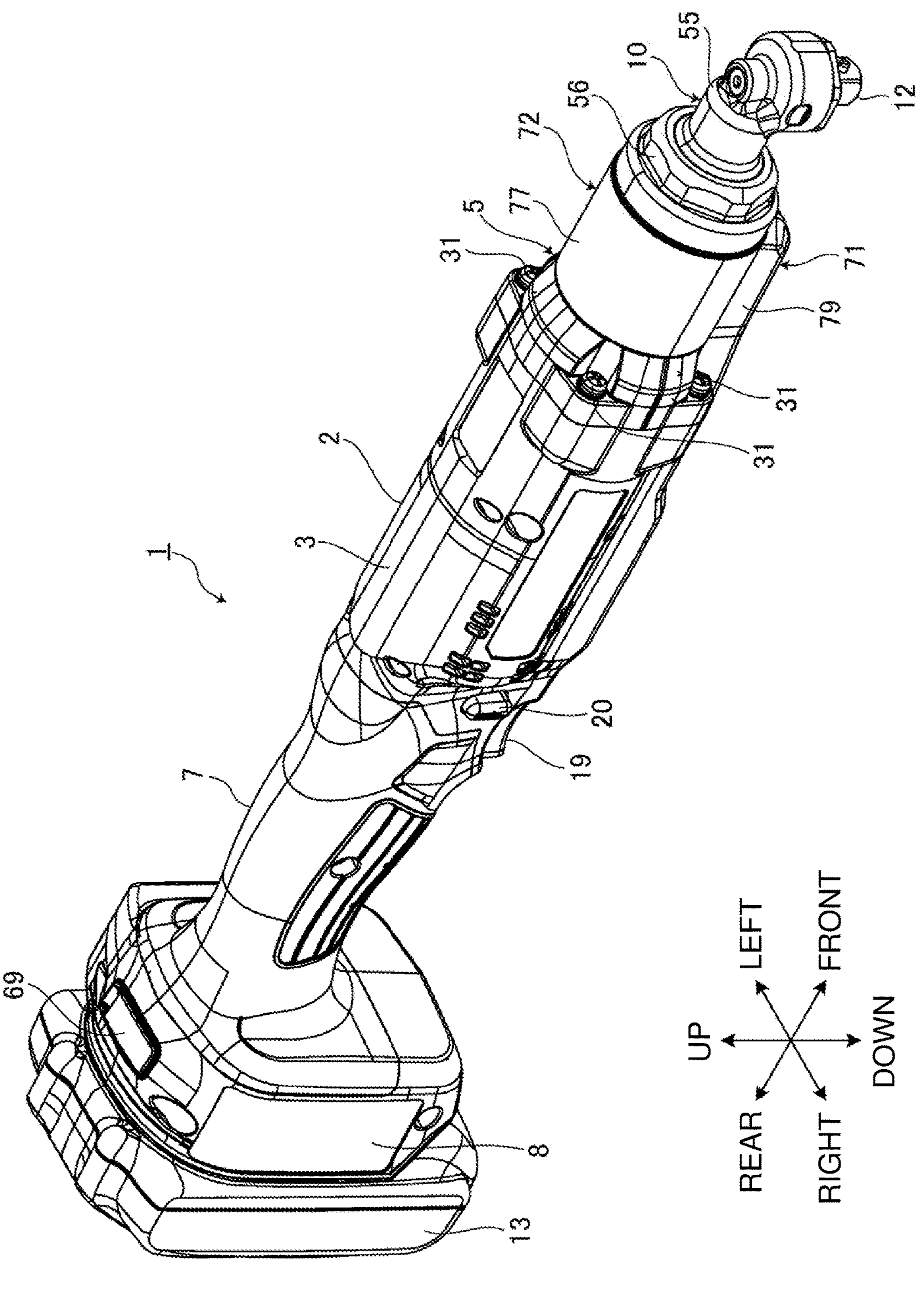
FIG. 2 is a perspective view of the electric work machine according to the first embodiment as viewed from the upper right front.
Figure 3:
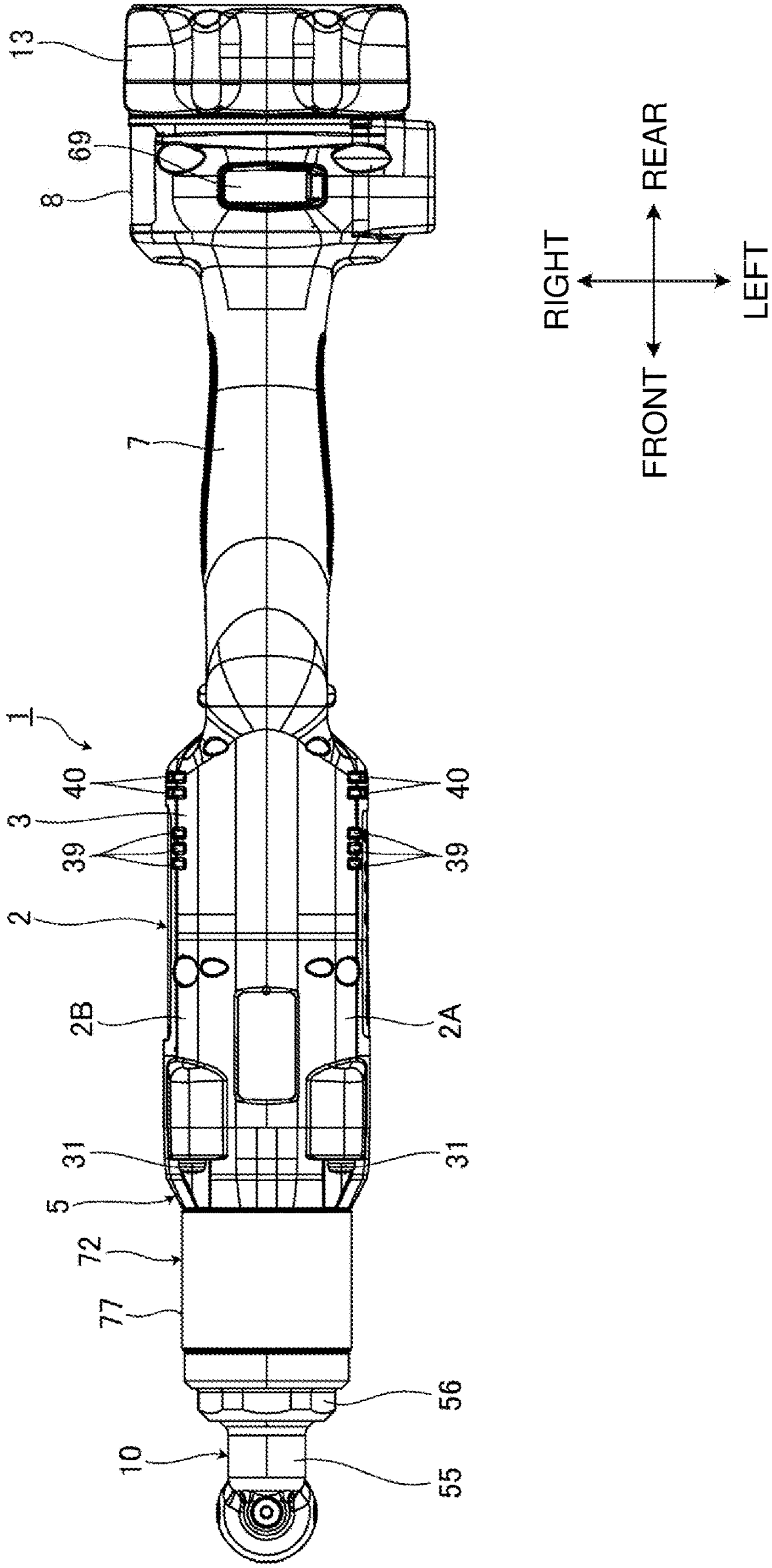
FIG. 3 is a top view of the electric work machine according to the first embodiment.
Figure 4:
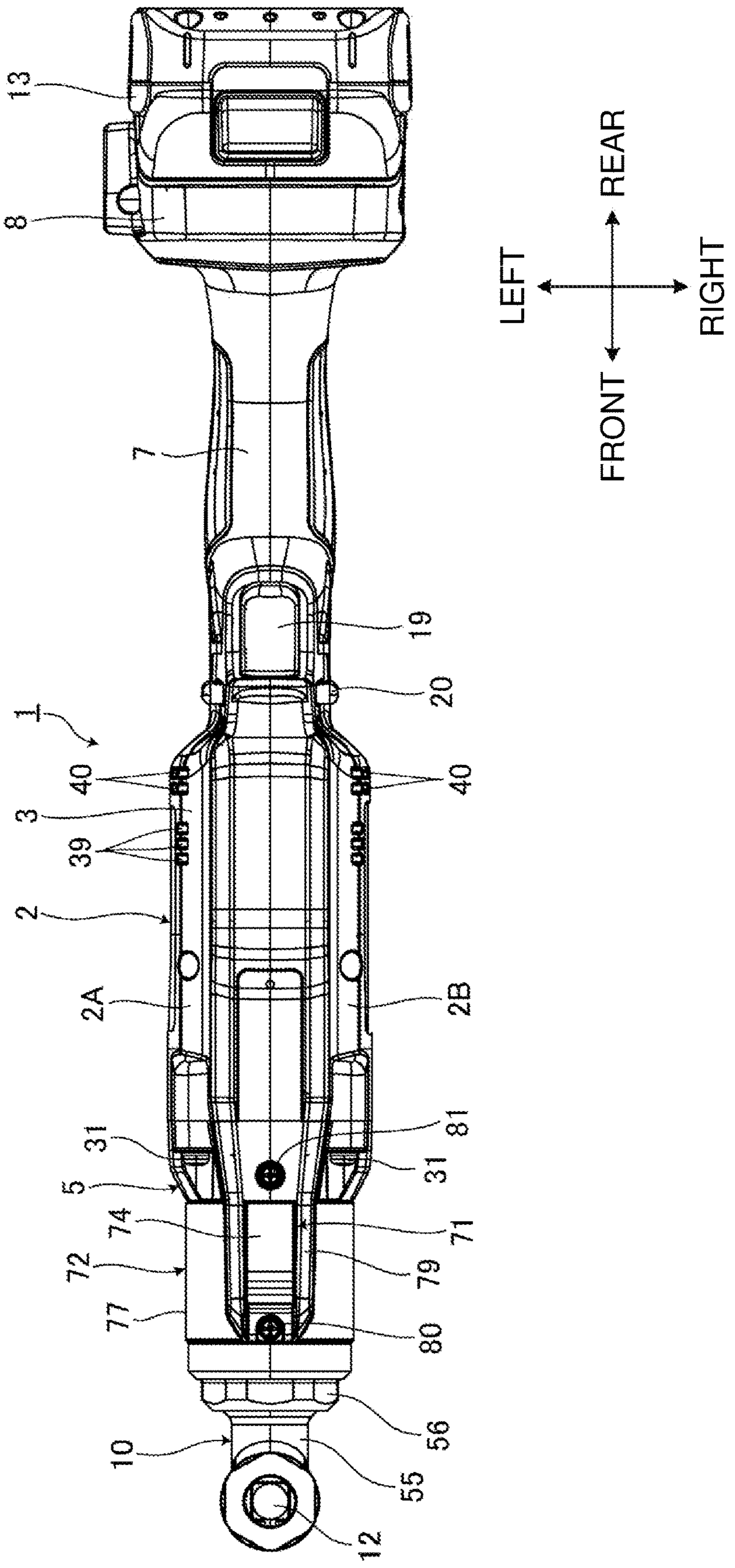
FIG. 4 is a bottom view of the electric work machine according to the first embodiment.
Figure 5:
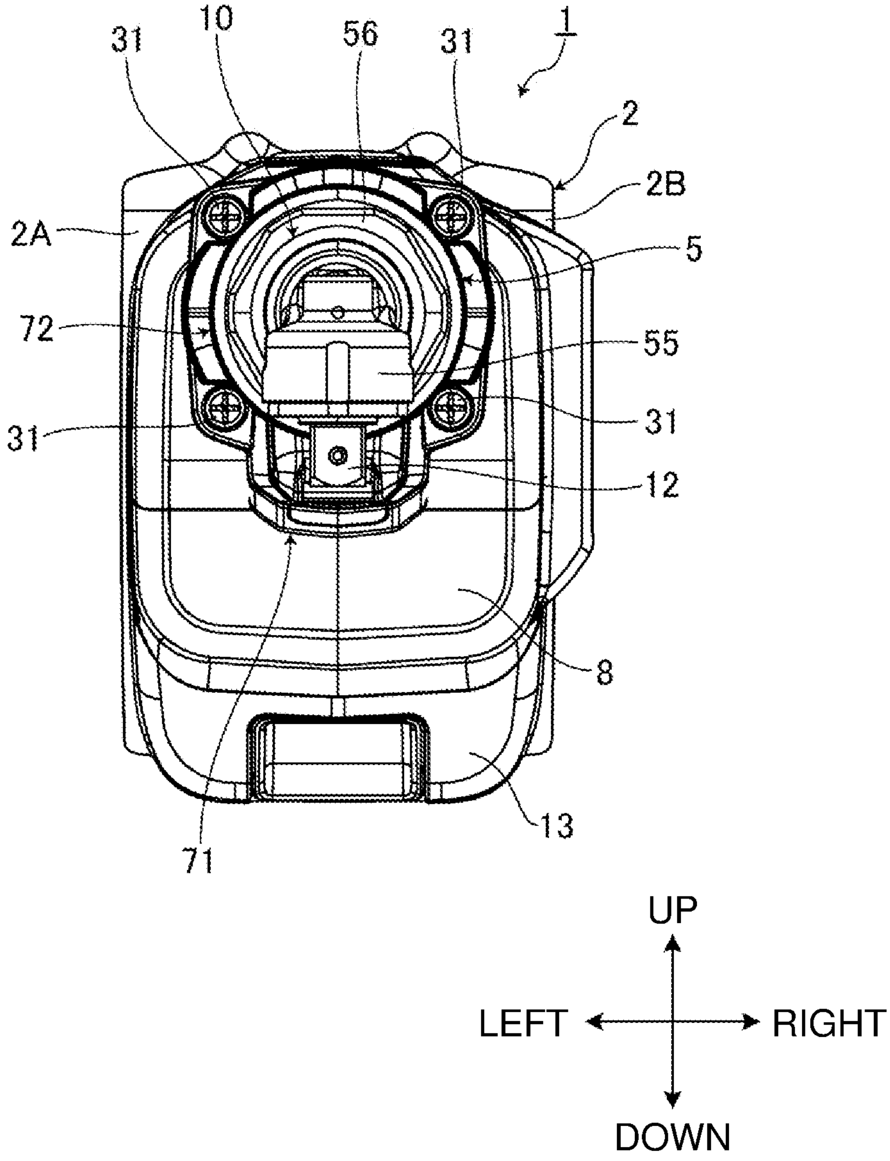
FIG. 5 is a front view of the electric work machine according to the first embodiment.
Figure 6:
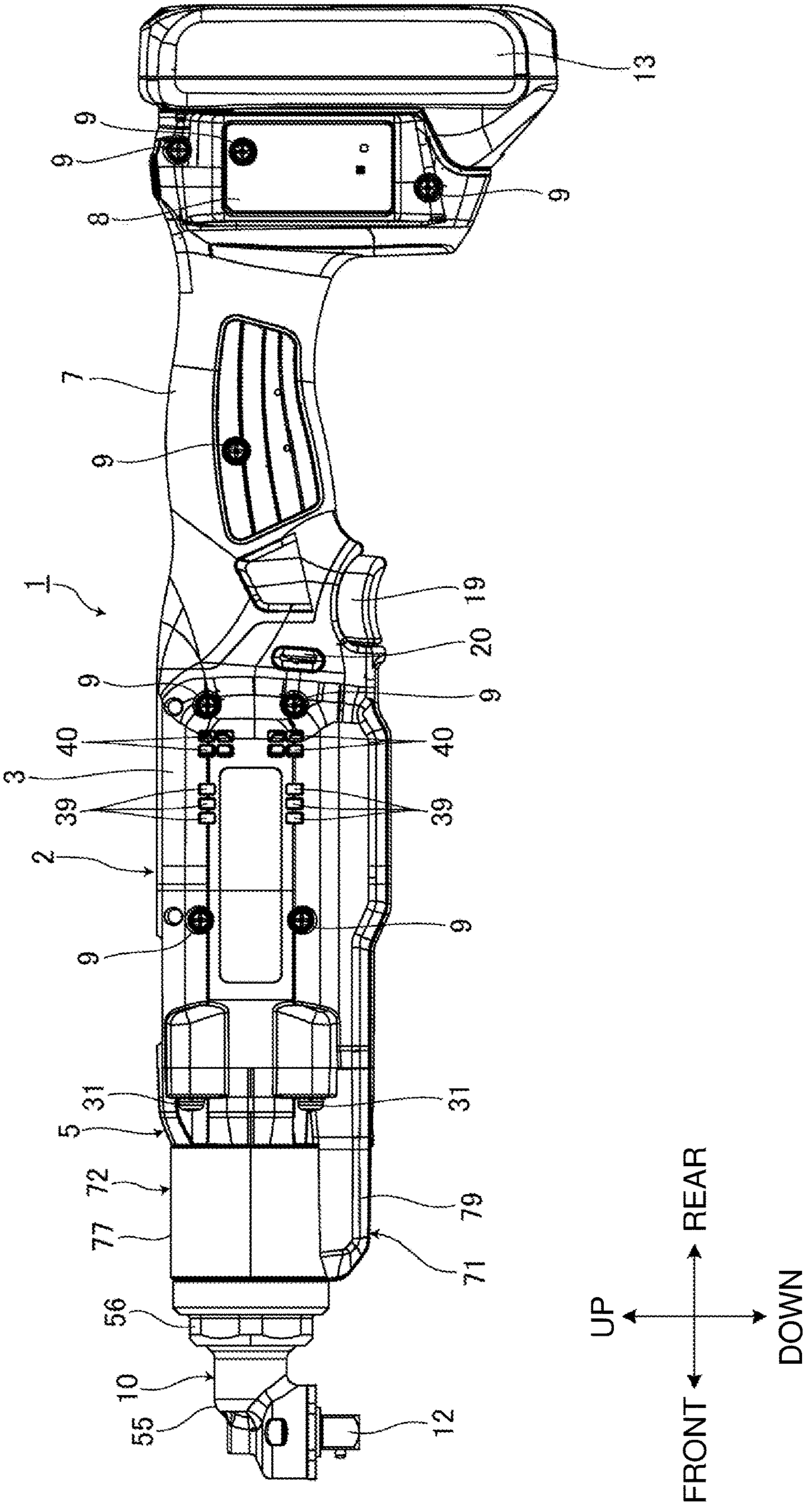
FIG. 6 is a left view of the electric work machine according to the first embodiment.
Figure 7:
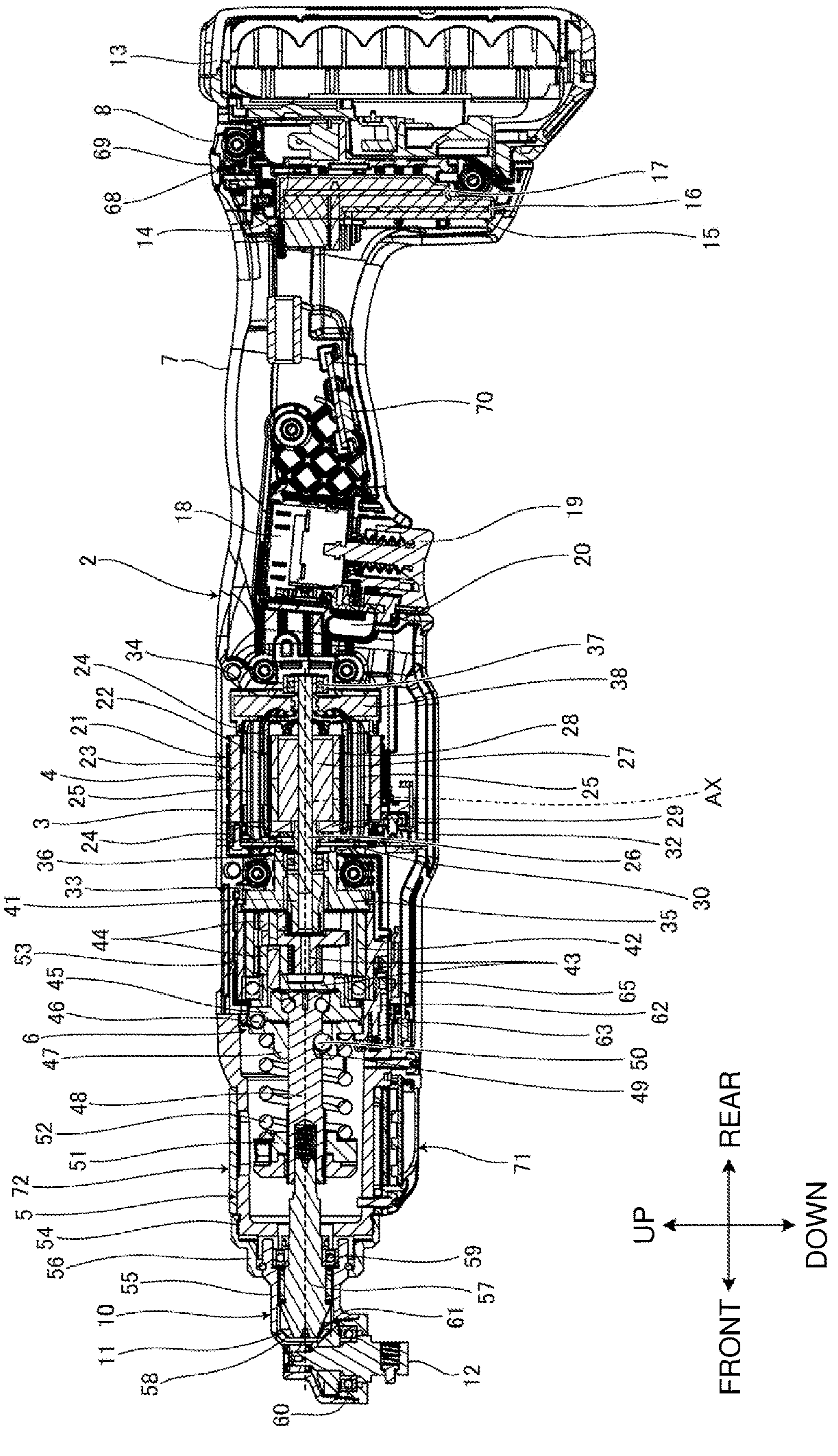
FIG. 7 is a longitudinal sectional view of the electric work machine according to the first embodiment.
Figure 8:
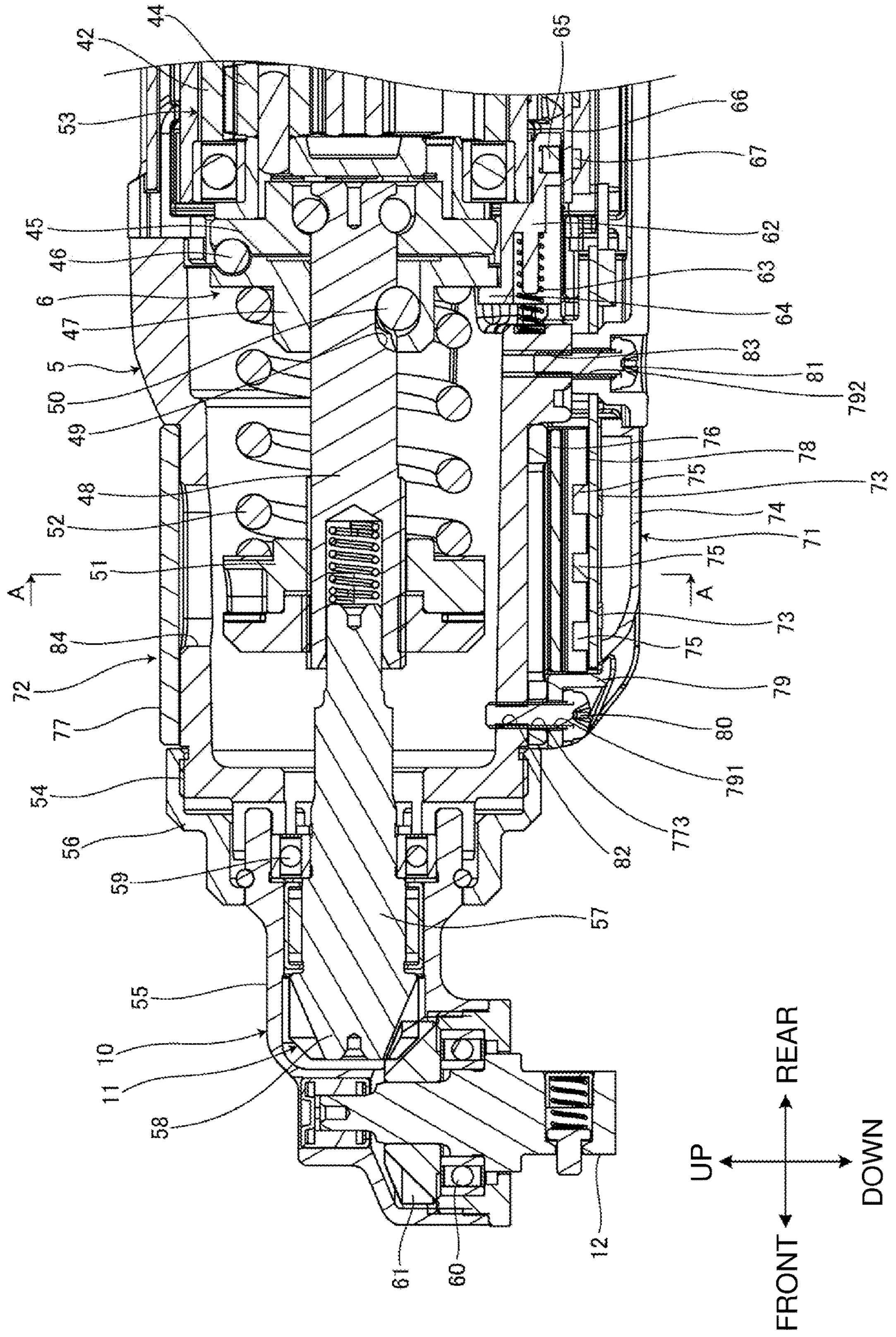
FIG. 8 is a longitudinal sectional view of a front portion of the electric work machine according to the first embodiment.
Figure 9:
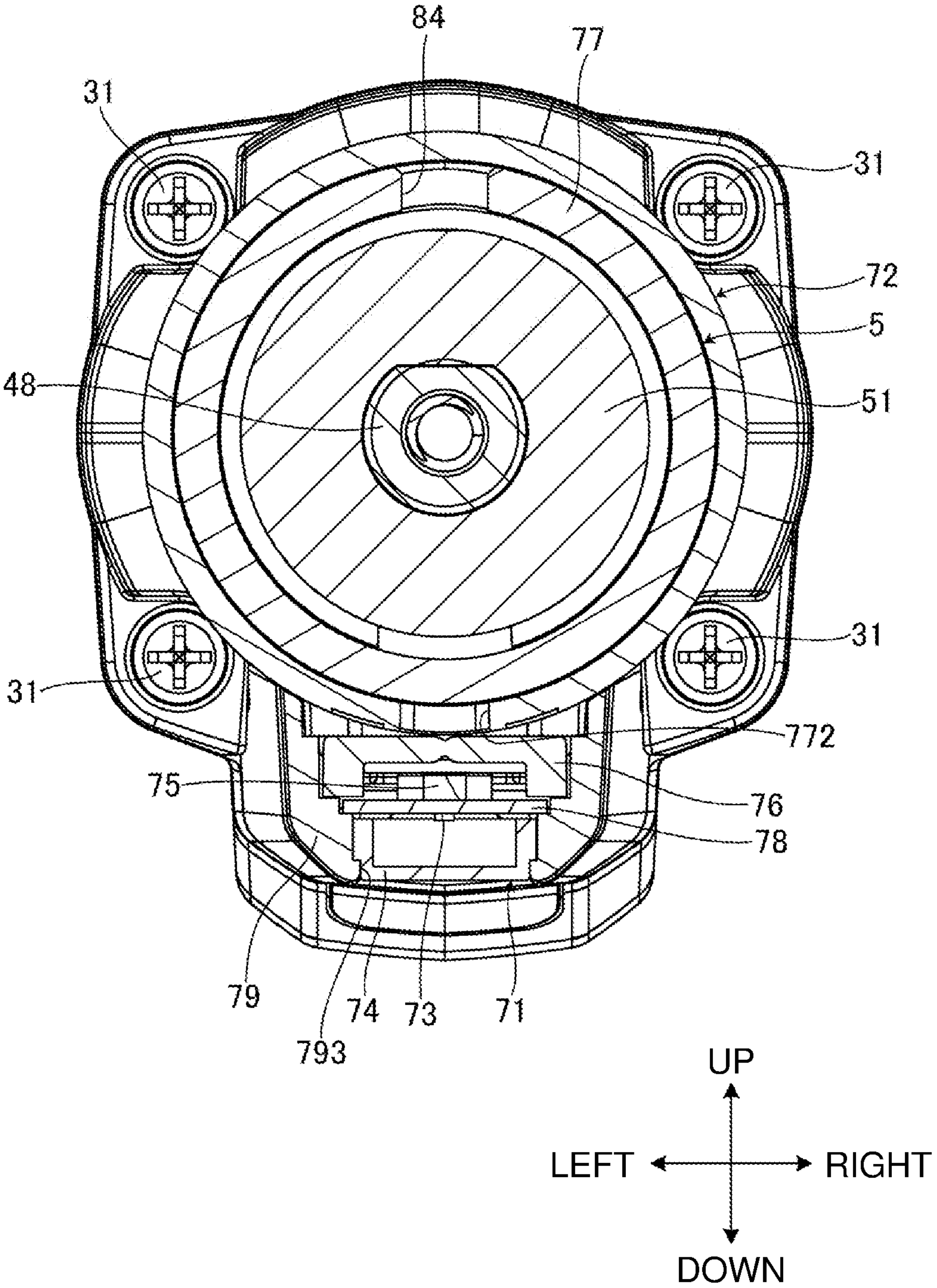
FIG. 9 is a cross-sectional view of the front portion of the electric work machine according to the first embodiment.

FIG. 1 is a perspective view of an electric work machine 1 according to the present embodiment as viewed from the upper left rear. FIG. 2 is a perspective view of the electric work machine 1 as viewed from the upper right front. FIG. 3 is a top view of the electric work machine 1. FIG. 4 is a bottom view of the electric work machine 1. FIG. 5 is a front view of the electric work machine 1. FIG. 6 is a left view of the electric work machine 1. FIG. 7 is a longitudinal sectional view of the electric work machine 1. FIG. 8 is a longitudinal sectional view of a front portion of the electric work machine 1. FIG. 9 is a cross-sectional view of the front portion of the electric work machine 1. FIG. 9 is a cross-sectional view taken along line A-A in FIG. 8 as viewed in the direction indicated by the arrows.

The electric work machine 1 according to the present embodiment is an angle screwdriver, which is a type of screwing tool.

The electric work machine 1 includes a main housing 2, a clutch case 5, a front housing 10, a controller 15, an external connection terminal 68, a sound output element 70, a trigger lever 19, a forward-reverse switch button 20, a motor 4, a reducer 53, a clutch 6, a spindle 48, a countershaft 57, an output unit 11, and a detector 67.

The main housing 2 is cylindrical and extends in the front-rear direction. The main housing 2 includes a left half housing 2A and a right half housing 2B. The right half housing 2B is on the right of the left half housing 2A. The left half housing 2A and the right half housing 2B are fastened together with multiple screws 9.

The main housing 2 includes a motor compartment 3, a grip 7, and a battery mount 8. The grip 7 is located behind the motor compartment 3. The battery mount 8 is located behind the grip 7. The motor compartment 3 accommodates a motor 4. The grip 7 is grippable by an operator. The battery mount 8 holds a battery pack 13.

The clutch case 5 is cylindrical and is located in front of the main housing 2. The clutch case 5 accommodates the clutch 6. The clutch case 5 is fastened to the front of the main housing 2 with multiple screws 31.

The front housing 10 is cylindrical and is located in front of the clutch case 5. The front housing 10 includes an intermediate portion that is bent downward. The front housing 10 accommodates the output unit 11. The front housing 10 is fastened to the front of the clutch case 5. The front housing 10 includes a bent cylinder 55 and a screw sleeve 56. The screw sleeve 56 surrounds the rear of the bent cylinder 55. The front housing 10 is fastened to the front portion of the clutch case 5 with the screw sleeve 56 engaged with a threaded portion 54 on the front portion of the clutch case 5.

The battery pack 13 powers the electric work machine 1. The battery mount 8 holds a terminal mount 14. The terminal mount 14 is electrically connectable to the battery pack 13. The battery pack 13 can be attached to and detached from the terminal mount 14. The battery pack 13 is slid upward from below the terminal mount 14 to be attached to the terminal mount 14.

The controller 15 controls at least the motor 4. The controller 15 is accommodated in the battery mount 8. The controller 15 includes a control circuit board 16 and a case 17. The control circuit board 16 on which electronic components such as a capacitor, a microcomputer, and a switching element are mounted. The case 17 accommodates the control circuit board 16.

The external connection terminal 68 is connected to an external device. The external connection terminal 68 is located above the terminal mount 14. The external connection terminal 68 is, for example, a universal serial bus (USB) terminal. The external device is, for example, a personal computer. The personal computer changes the settings of the controller 15 through the external connection terminal 68. The external connection terminal 68 is covered with a cover 69.

The sound output element 70 outputs an indication sound. The sound output element 70 is, for example, a buzzer. The sound output element 70 is accommodated in the grip 7. The sound output element (indicator) 70 indicates at least the operating state of the electric work machine 1.

The trigger lever 19 protrudes downward from a lower front portion of the grip 7. The trigger lever 19 is operable by the operator to drive the motor 4. The trigger lever 19 is connected to a trigger switch 18. The trigger switch 18 is accommodated in the grip 7. When the trigger lever 19 is operated to move upward, the trigger switch 18 transmits an operation signal for driving the motor 4 to the controller 15.

The forward-reverse switch button 20 protrudes laterally from a front portion of the grip 7. The forward-reverse switch button 20 is operable to change the rotation direction of the motor 4.

The motor 4 is a power source for the electric work machine 1. The motor 4 is an inner-rotor brushless motor. The motor 4 includes a stator 21 and a rotor 22. The rotor 22 rotates relative to the stator 21. The rotor 22 rotates about the rotation axis AX extending in the front-rear direction.

The stator 21 includes a stator core 23, insulators 24, multiple coils 25, and a terminal unit 32. The insulators 24 are fixed to front and rear portions of the stator core 23. The multiple coils 25 are wound around the stator core 23 with the insulators 24 between them. The terminal unit 32 short-circuits the coils 25.

The rotor 22 includes a rotor shaft 26, a rotor core 27, multiple permanent magnets 28, and multiple sensor permanent magnets 29. The rotor core 27 surrounds the rotor shaft 26. The permanent magnets 28 are fixed to an outer circumferential surface of the rotor core 27. The sensor permanent magnets 29 are fixed to the front end face of the rotor core 27.

A sensor circuit board 30 is fixed to the front insulator 24. The sensor circuit board 30 supports a rotation detector that detects rotation of the rotor 22. The rotation detector includes a magnetic sensor that detects the positions of the sensor permanent magnets 29. The rotation detector transmits a detection signal to the controller 15. The controller 15 controls a drive current supplied to the motor 4 based on the detection signal from the rotation detector.

The main housing 2 includes a front wall 33 and a rear rib 34 inside. The front wall 33 partitions the motor compartment 3 from the clutch case 5. The rear rib 34 separates the motor compartment 3 from the grip 7.

The rotor shaft 26 extends in the front-rear direction. The rotor shaft 26 has a front portion supported with a bearing 36 in a rotatable manner. The rotor shaft 26 has a rear portion supported with a bearing 37 in a rotatable manner. The bearing 36 is held by a bearing holder 35. The bearing holder 35 is cylindrical and is supported on the front wall 33. The bearing 37 is held at the center of the rear rib 34. A centrifugal fan 38 is fixed to a portion of the rotor shaft 26 between the stator 21 and the bearing 37. The centrifugal fan 38 rotates together with the rotor shaft 26. This generates an airflow for cooling the motor 4. The motor compartment 3 has multiple inlets 39 in a portion radially outside the stator 21. The motor compartment 3 has multiple outlets 40 in a portion radially outside the centrifugal fan 38. As the centrifugal fan 38 rotates, air outside the motor compartment 3 flows into the motor compartment 3 through the inlets 39, and flows toward the outlets 40 while being in contact with the motor 4. This cools the motor 4. The air passing through the motor 4 flows out of the motor compartment 3 through the outlets 40.

The rotor shaft 26 has its front end located frontward from the bearing holder 35. The bearing holder 35 surrounds the rotor shaft 26. A pinion gear 41 is fixed to the front end of the rotor shaft 26. The rotor shaft 26 is connected to the reducer 53 through the pinion gear 41.

The reducer 53 transmits a rotational force generated by the motor 4 to the spindle 48. The reducer 53 reduces the rotational speed of the rotor shaft 26 and transmits the rotation to the spindle 48. The reducer 53 connects the rotor shaft 26 and the spindle 48. The reducer 53 rotates the spindle 48 at a lower rotational speed than the rotor shaft 26. The reducer 53 includes a planetary gear assembly that is driven with a rotational force generated by the motor 4.

The reducer 53 is located between the motor 4 and the output unit 11 in the front-rear direction. The reducer 53 includes an internal gear 42, two planetary gears 44 in the front-rear direction, and two carriers 43 in the front-rear direction. The two planetary gears 44 in the front-rear direction are located inside the internal gear 42. The two carriers 43 in the front-rear direction support the planetary gears 44. The pinion gear 41 is connected to the rear planetary gear 44.

The clutch 6 is located between the motor 4 and the output unit 11 in the front-rear direction. The clutch 6 is located between the reducer 53 and the output unit 11 in the front-rear direction. The clutch 6 operates to change between an engagement state and a release state. In the engagement state, the clutch 6 transmits a rotational force from the motor 4 transmitted through the reducer 53 to the output unit 11. In the release state, the clutch 6 blocks transmission of a rotational force from the motor 4 to the output unit 11.

The clutch 6 includes a rear cam 45 and a front cam 47. The rear cam 45 rotates together with the front carrier 43. The front cam 47 is connected to the rear cam 45 with cam balls 46 between them. The rear cam 45 and the front cam 47 rotate together in the rotation direction with the cam balls 46.

The spindle 48 is connected to the reducer 53 with the clutch 6 between them. The spindle 48 has a cam groove 49. The cam groove 49 receives balls 50. The spindle 48 is connected to the front cam 47 with the balls 50 between them. The front cam 47 and the spindle 48 rotate together in the rotation direction with the balls 50. The front cam 47 is movable in the front-rear direction relative to the spindle 48.

A spring receiver 51 surrounds a front portion of the spindle 48. The spring receiver 51 is located frontward from the front cam 47. A coil spring 52 is located between the spring receiver 51 and the front cam 47. The coil spring 52 urges the front cam 47 backward. This causes the front cam 47 to be at a retracted position for engagement with the cam balls 46.

The output unit 11 includes a countershaft 57 and an output shaft 12. The countershaft 57 is connected to the front portion of the spindle 48. The countershaft 57 has a hexagonal column on its rear end. The spindle 48 has a hexagonal hole in its front end. The hexagonal column on the countershaft 57 is fitted into the hexagonal hole in the spindle 48. The countershaft 57 rotates together with the spindle 48. The countershaft 57 has its rear portion accommodated in the clutch case 5. The countershaft 57 has its front portion accommodated in the bent cylinder 55. A bevel gear 58 is located at the front end of the countershaft 57. The countershaft 57 is supported with a bearing 59 in a rotatable manner.

The output shaft 12 rotates about a rotation axis extending vertically. The output shaft 12 is supported with a bearing 60 in a rotatable manner. The output shaft 12 has its lower end protruding downward from the front housing 10. The output shaft 12 receives a bevel gear 61 at its upper end. The bevel gear 58 on the countershaft 57 is connected to the bevel gear 61 on the output shaft 12. When the spindle 48 rotates to rotate the countershaft 57, the output shaft 12 rotates. The output shaft 12 rotates while holding a screwdriver, which is a type of tool. The output shaft (tool holder) 12 rotates with a rotational force generated by the motor 4.

In the engagement state, the rear cam 45 rotates together with the front carrier 43 with a rotational force from the motor 4, the front cam 47 rotates with the cam balls 46, and the spindle 48 rotates with the balls 50. This causes the countershaft 57 to rotate and the output shaft 12 to rotate with the bevel gear 58 and the bevel gear 61.

In a screwing operation, the motor 4 starts driving, with the clutch 6 in the engagement state. When load torque transmitted from the output shaft 12 to the spindle 48 through the countershaft 57 exceeds set torque in the screwing operation, the clutch 6 changes from the engagement state to the release state. The load torque exceeding the set torque means that a screw is tightened into a workpiece with a target tightening force and the screwing operation is performed appropriately. The set torque is defined by a rearward urging force from the coil spring 52 against the front cam 47.

When the clutch 6 is in the release state, the front cam 47 advances through the balls 50 rolling in the cam groove 49. The front cam 47 is then disengaged from the cam balls 46 and rotates without engagement with the rear cam 45. This blocks transmission of a rotational force from the motor 4 to the spindle 48, thus causing the clutch 6 to enter the release state.

In other words, when the load torque transmitted from the output shaft 12 to the spindle 48 is less than or equal to the set torque, the front cam 47 is at the retracted position under a rearward urging force from the coil spring 52. In response to this, the clutch 6 enters the engagement state to transmit a rotational force from the motor 4 to the spindle 48. When the load torque transmitted from the output shaft 12 to the spindle 48 exceeds the set torque, the front cam 47 moves to an advanced position against the urging force from the coil spring 52. In response to this, the clutch 6 enters the release state, and a rotational force from the motor 4 is not transmitted to the spindle 48.

The detector 67 is supported on a detection substrate 66. The detector 67 detects the release state of the clutch 6. A sensor board 62 is located below the clutch 6. The sensor board 62 holds a magnet 65. The sensor board 62 is movable in the front-rear direction. The sensor board 62 is urged rearward by a coil spring 63. The sensor board 62 includes an engagement tab 64. The engagement tab 64 protrudes upward from a front portion of the sensor board 62. The engagement tab 64 is located frontward from the front cam 47. In response to the clutch 6 entering the release state, the front cam 47, in contact with the engagement tab 64, moves to the advanced position. The sensor board 62 holding the magnet 65 then moves forward together with the front cam 47.

The detection substrate 66 supporting the detector 67 is located below the sensor board 62. The detector 67 includes a magnetic sensor that can detect movement of the magnet 65 held on the sensor board 62. The magnetic sensor is, for example, a Hall integrated circuit (IC). When the clutch 6 operates to move the sensor board 62 forward, the detector 67 detects a change in the magnetic field caused by the magnet 65. The detector 67 transmits a detection signal to the controller 15.

Illumination Light Emitter and Indication Light Emitter

The electric work machine 1 includes an illumination light emitter 71 and an indication light emitter 72. The illumination light emitter 71 emits illumination light to illuminate at least a screwdriver bit held on the output shaft 12. The indication light emitter 72 emits at least indication light indicating the operating state of the electric work machine 1. The operating state of the electric work machine 1 includes the operational status of the clutch 6. The operating state of the electric work machine 1 includes the status of the screwing operation.

The illumination light emitter 71 emits a single color of light. Illumination light emitted from the illumination light emitter 71 is, for example, white light.

The indication light emitter 72 can emit multiple colors of light. Indication light emitted from the indication light emitter 72 includes at least one of green indication light, yellow indication light, or red indication light.

The illumination light emitter 71 emits illumination light in cooperation with the trigger switch 18. The illumination light emitter 71 emits illumination light in cooperation with the motor 4. When the trigger lever 19 is operated to move upward and the trigger switch 18 is turned on, the motor 4 is driven. When the trigger lever 19 is released and the trigger switch 18 is turned off, the motor 4 is stopped. The illumination light emitter 71 emits illumination light when the trigger switch 18 is turned on. The illumination light emitter 71 emits no illumination light when the trigger switch 18 is turned off. The illumination light emitter 71 emits illumination light when the motor 4 is driven. The illumination light emitter 71 emits no illumination light when the motor 4 is stopped.

The indication light emitter 72 emits indication light in cooperation with the clutch 6. The indication light emitter 72 emits no indication light when the clutch 6 is in the engagement state during the screwing operation with the motor 4 being driven.

The indication light emitter 72 emits, for example, green indication light when the clutch 6 changes from the engagement state to the release state during the screwing operation with the motor 4 being driven. When the front cam 47 moves from the retracted position to the advanced position, the clutch 6 changes from the engagement state to the release state. This moves the magnet 65 held on the front cam 47 forward. The detector 67 detects the advancement of the magnet 65. In response to the detector 67 detecting the advancement of the magnet 65, the controller 15 determines that the status of the screwing operation is appropriate, and causes the indication light emitter 72 to emit, for example, green indication light.

The indication light emitter 72 emits, for example, red indication light when the clutch 6 does not change from the engagement state to the release state during the screwing operation with the motor 4 being driven. For example, in the screwing operation, the operator may release the operation of the trigger lever 19 before the screw is tightened into the workpiece with a target tightening force. In response to the motor 4 being stopped before the detector 67 detects the advancement of the magnet 65, the controller 15 determines that the status of the screwing operation is defective, and causes the indication light emitter 72 to emit, for example, red indication light.

The operating state of the electric work machine 1 indicated by the indication light emitter 72 is not limited to the operational status of the clutch 6 or the status of the screwing operation. In response to a decrease in the remaining power level of the battery pack 13, for example, the controller 15 may cause the indication light emitter 72 to blink red indication light. In response to receiving an abnormal voltage, the controller 15 may cause the indication light emitter 72 to emit red indication light and green indication light alternately. In response to having an abnormal temperature, the controller 15 may cause the indication light emitter 72 to blink red light.

The sound output element (indicator) 70 outputs at least an indication sound for indicating the operating state of the electric work machine 1. In response to the detector 67 detecting the advancement of the magnet 65, the controller 15 causes the indication light emitter 72 to emit, for example, green indication light, and causes the sound output element 70 to output a first indication sound. In response to the motor 4 being stopped before the detector 67 detects the advancement of the magnet 65, the controller 15 causes the indication light emitter 72 to emit, for example, red indication light, and causes the sound output element 70 to output a second indication sound.

In response to a decrease in the remaining power level of the battery pack 13, for example, the controller 15 may cause the indication light emitter 72 to blink red indication light, and cause the sound output element 70 to output a third indication sound. In response to receiving a normal voltage, the controller 15 may cause the indication light emitter 72 to emit red indication light and green indication light alternately, and cause the sound output element 70 to output a fourth indication sound. In response to having an abnormal temperature, the controller 15 may cause the indication light emitter 72 to blink red light, and cause the sound output element 70 to output a fifth indication sound.

Figure 10:
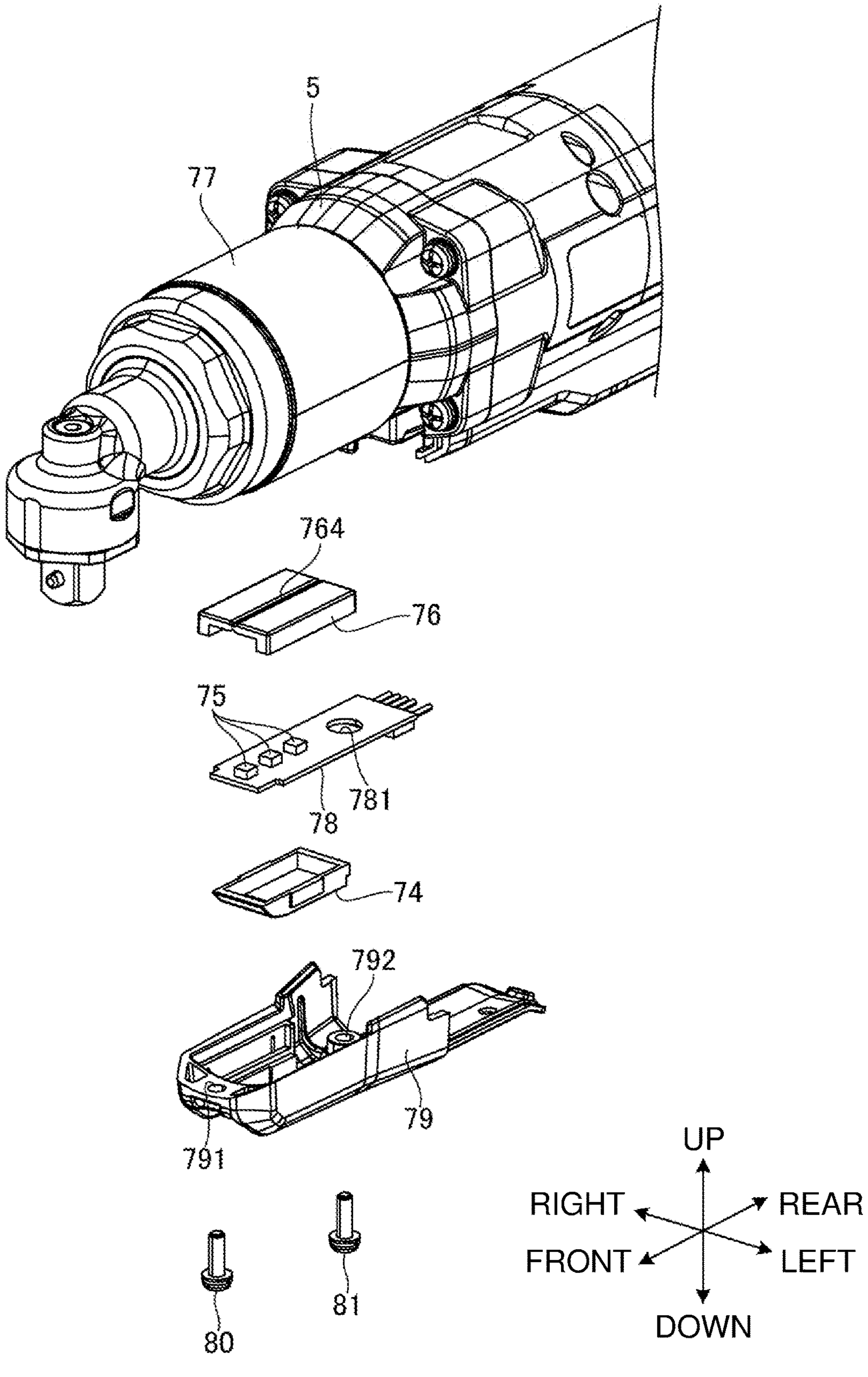
FIG. 10 is an exploded perspective view of the front portion of the electric work machine according to the first embodiment as viewed from the upper left front.
Figure 11:
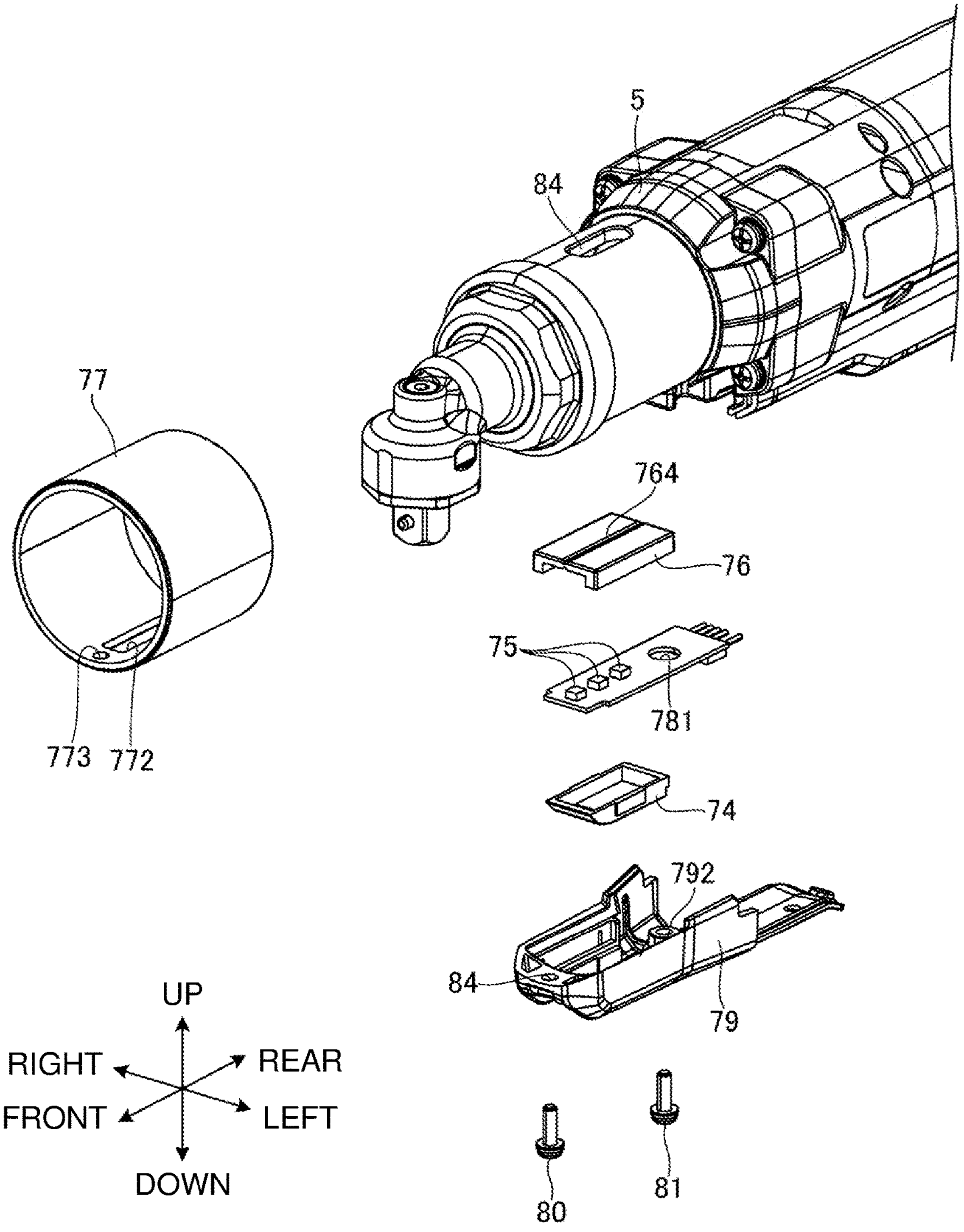
FIG. 11 is an exploded perspective view of the front portion of the electric work machine according to the first embodiment as viewed from the upper left front.
Figure 12:
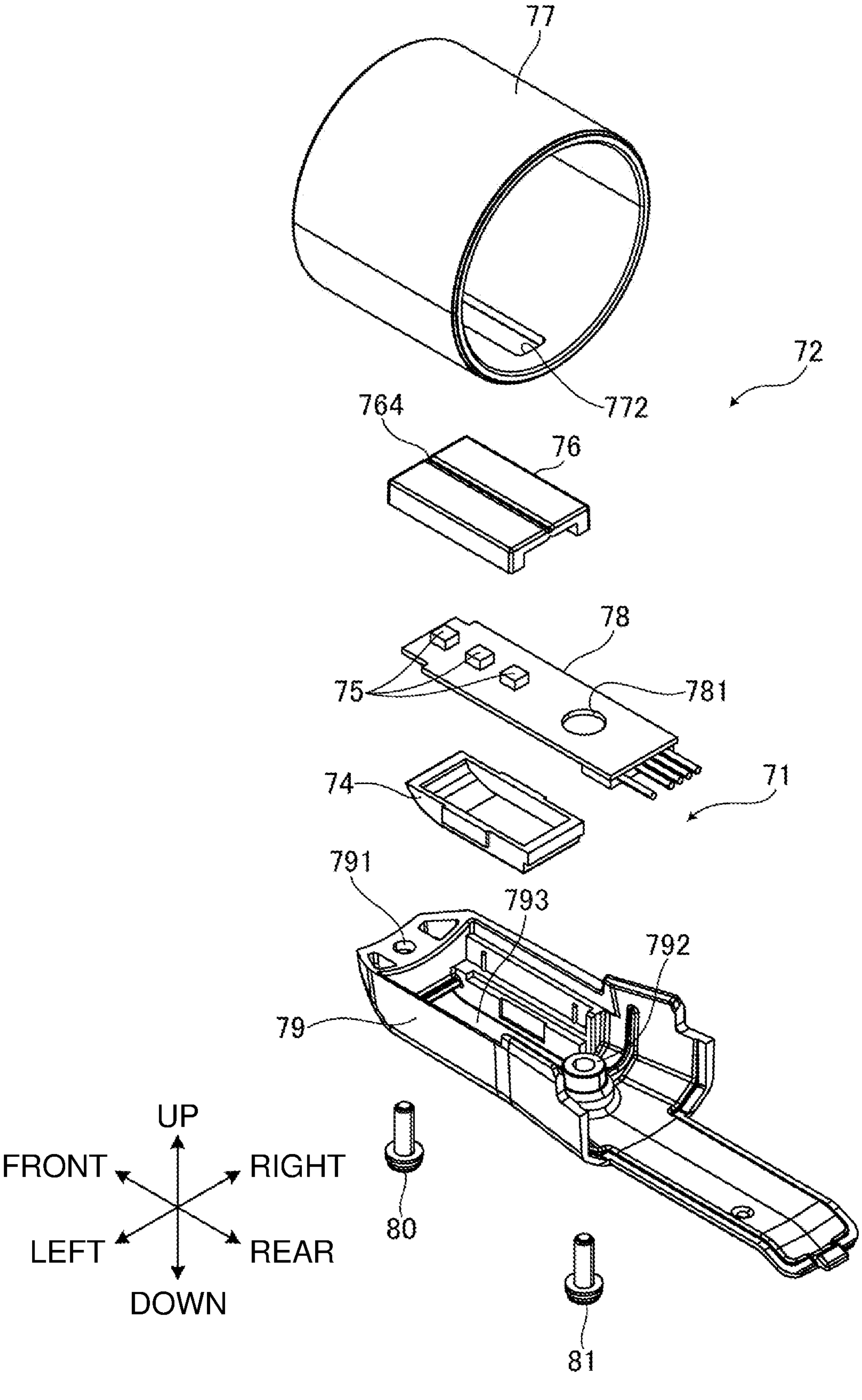
FIG. 12 is an exploded perspective view of an illumination light emitter and an indication light emitter in the first embodiment as viewed from the upper left rear.
Figure 13:
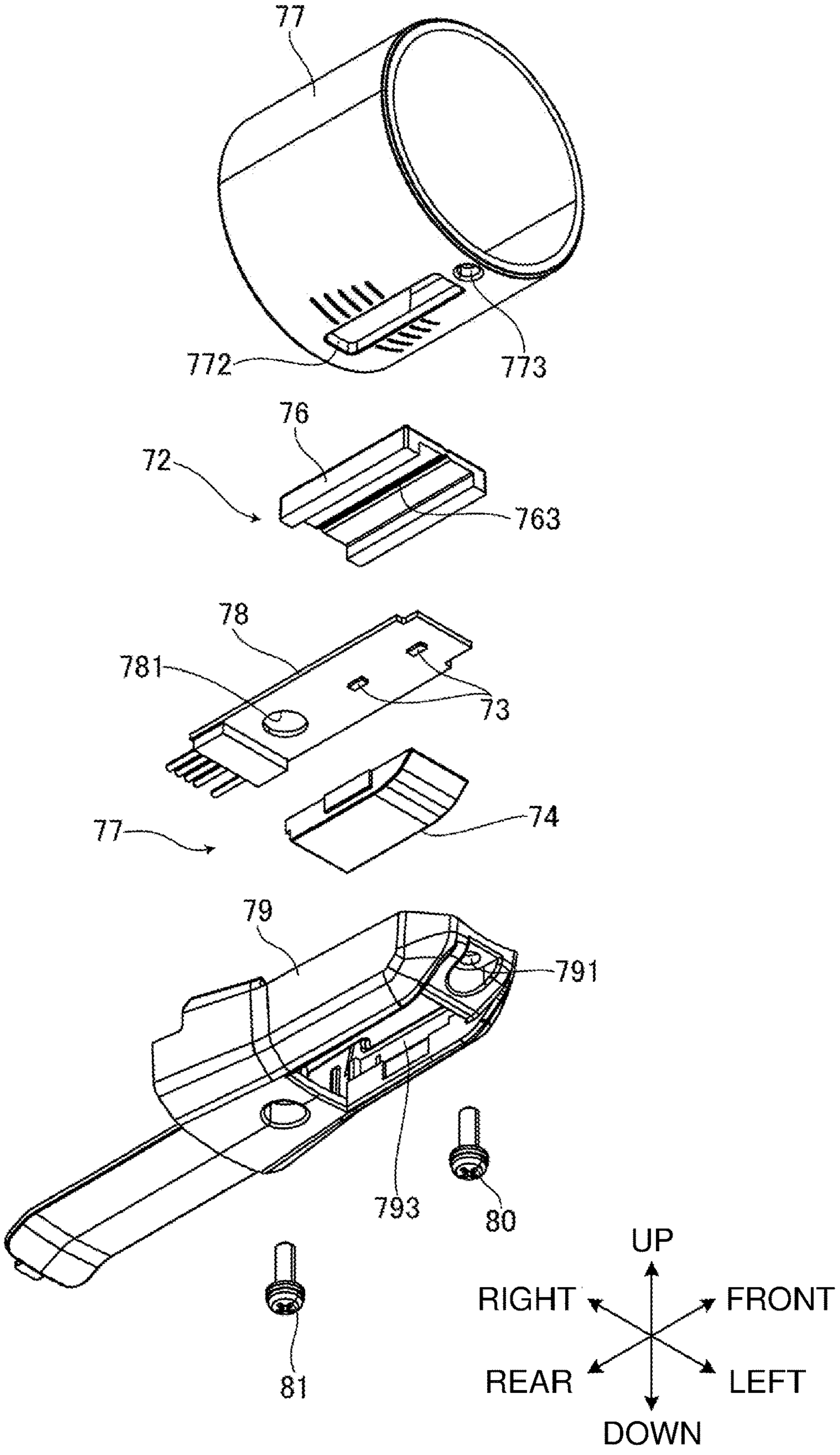
FIG. 13 is an exploded perspective view of the illumination light emitter and the indication light emitter in the first embodiment as viewed from the lower right front.
Figure 14:
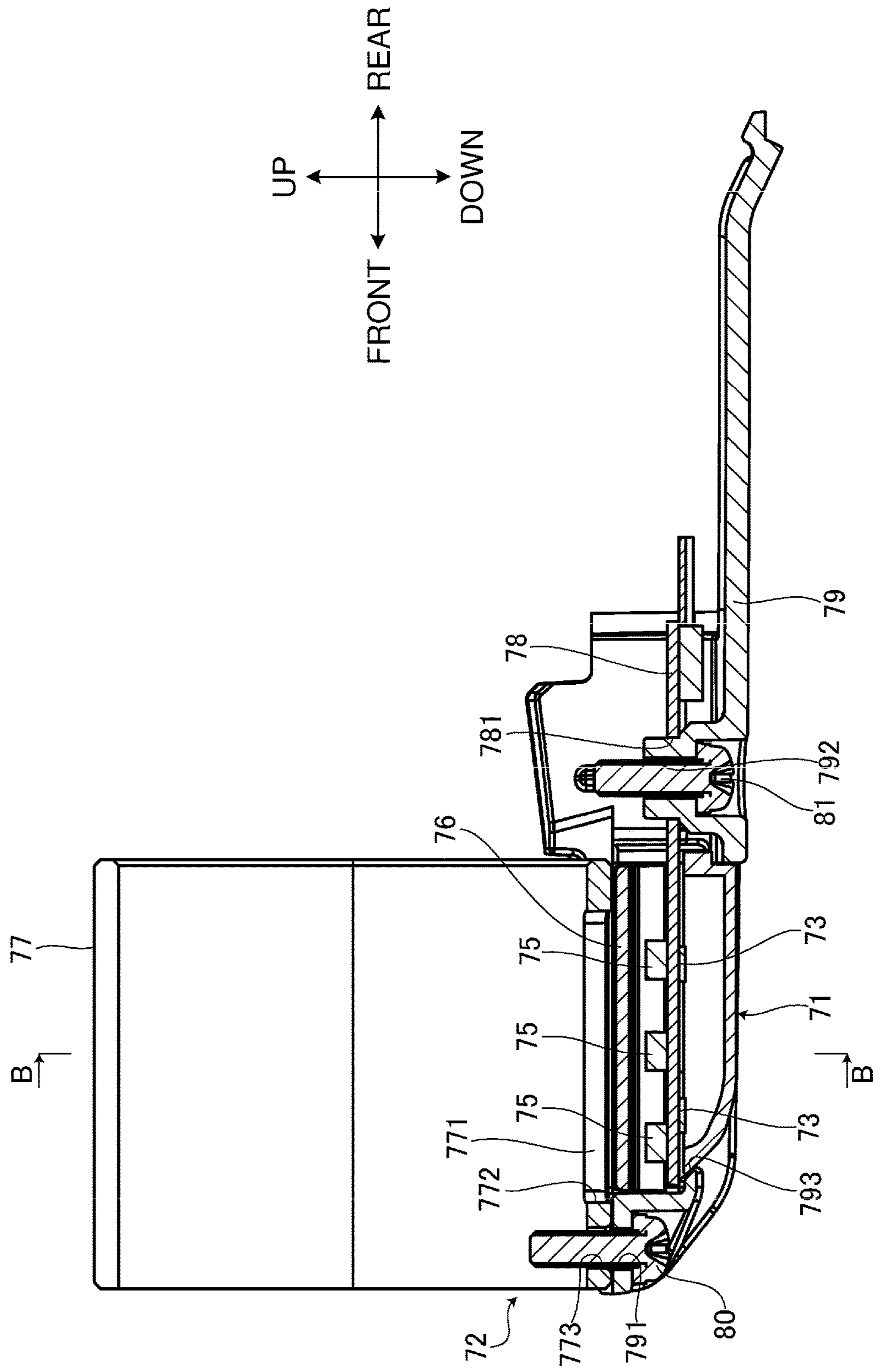
FIG. 14 is a longitudinal sectional view of the illumination light emitter and the indication light emitter in the first embodiment.
Figure 15:
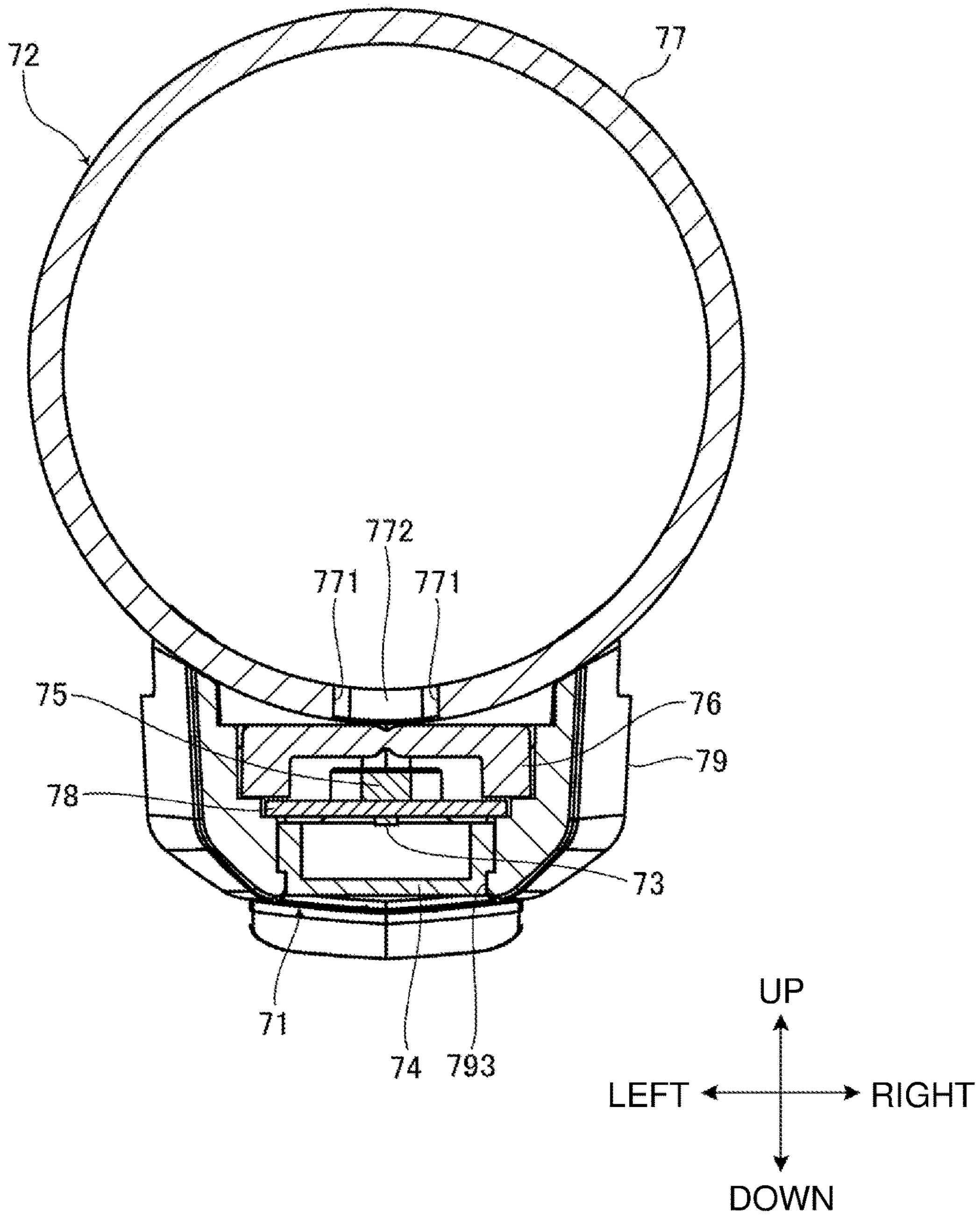
FIG. 15 is a cross-sectional view of the illumination light emitter and the indication light emitter in the first embodiment.
Figure 16:
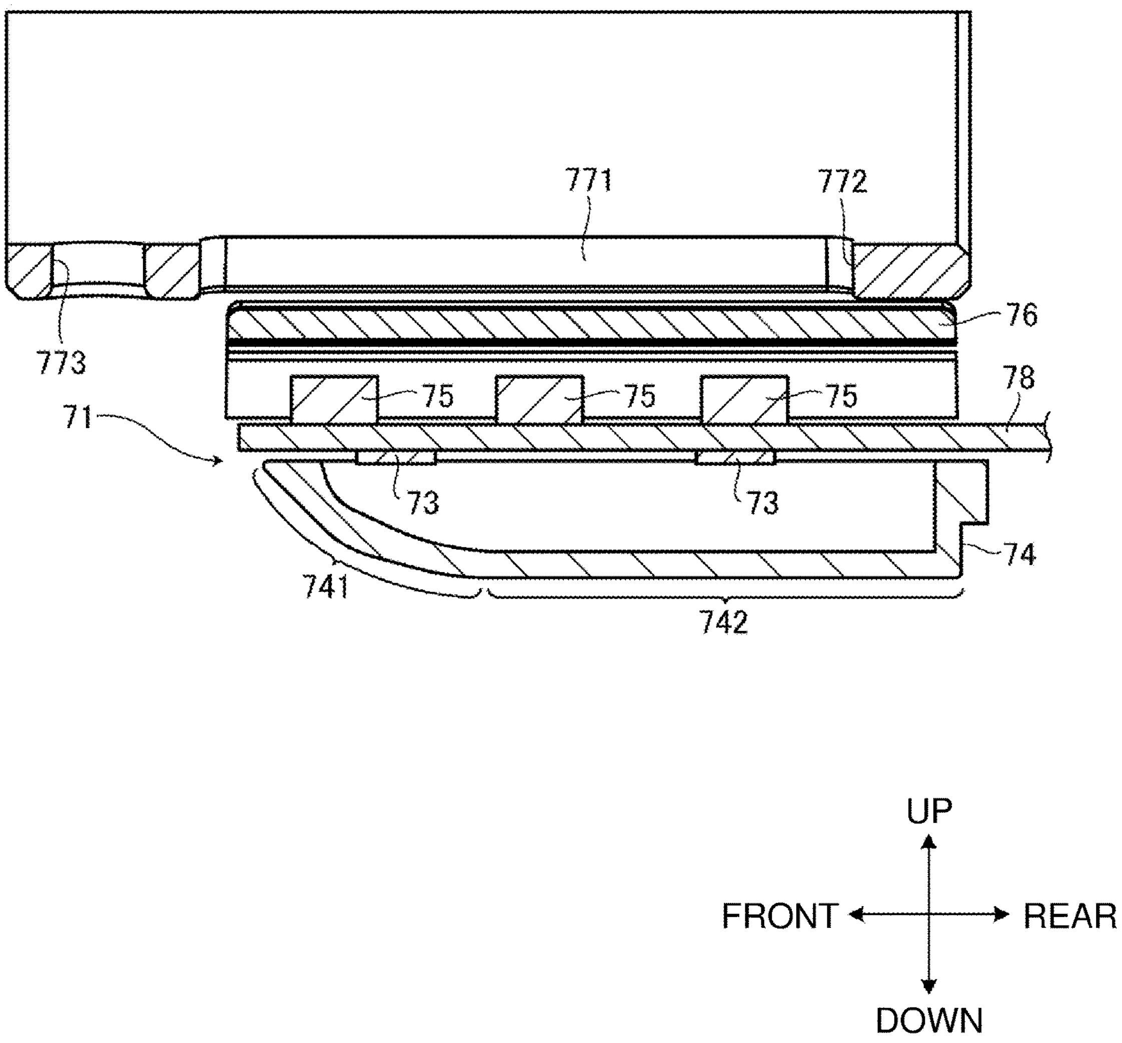
FIG. 16 is a longitudinal sectional view of the illumination light emitter in the first embodiment.
Figure 17:
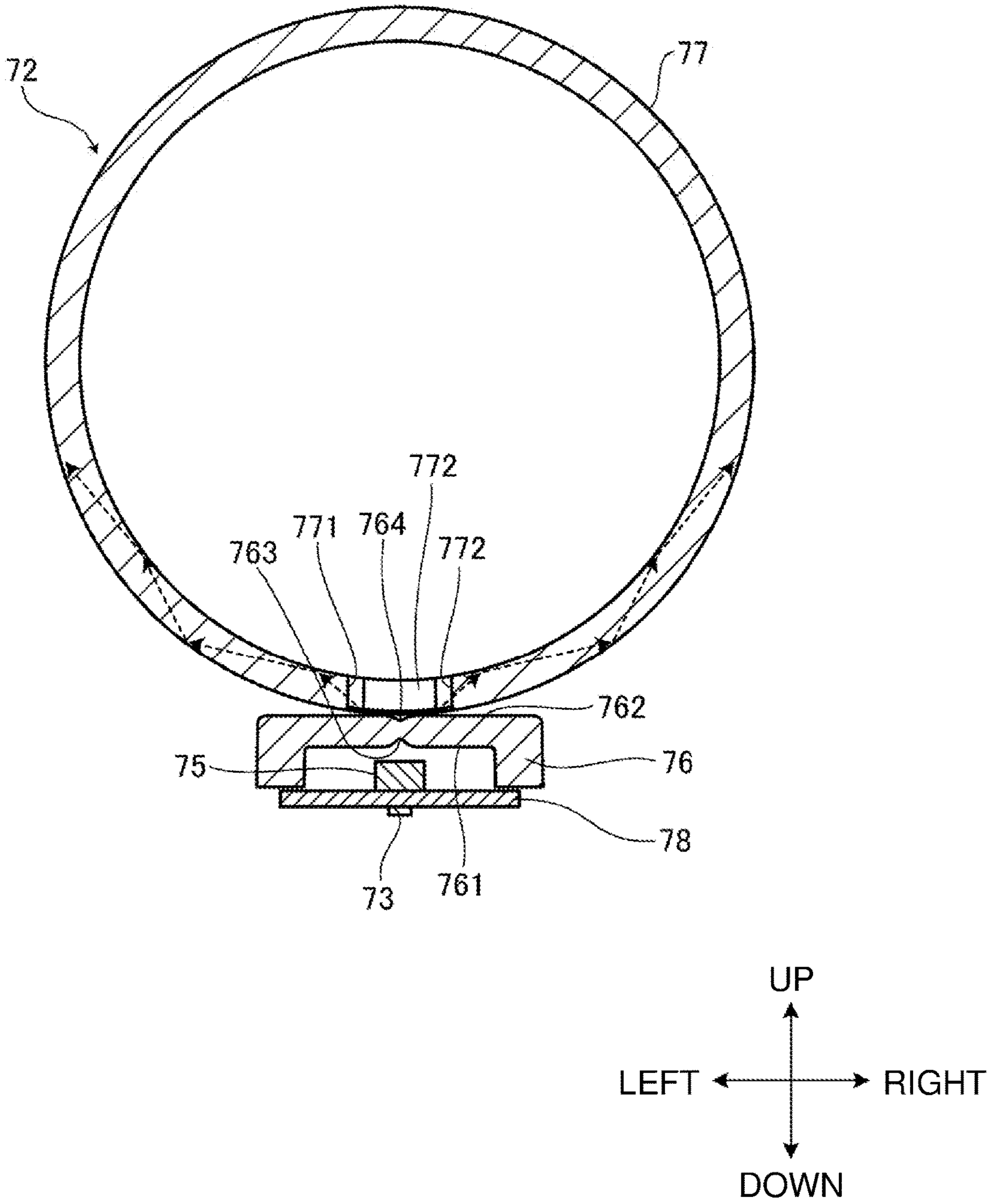
FIG. 17 is a cross-sectional view of the indication light emitter in the first embodiment.
Figure 18:
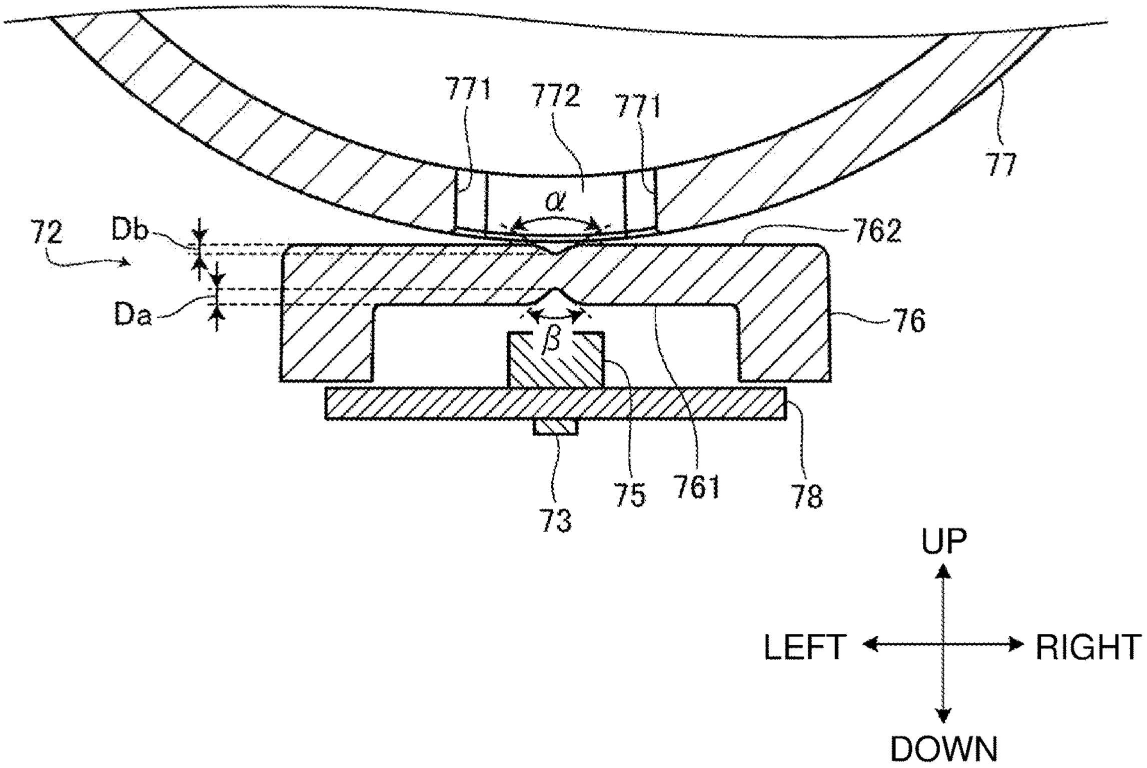
FIG. 18 is a partially enlarged cross-sectional view of the indication light emitter in the first embodiment.

FIG. 10 is an exploded perspective view of the front portion of the electric work machine 1 as viewed from the upper left front. FIG. 11 is an exploded perspective view of the front portion of the electric work machine 1 as viewed from the upper left front. FIG. 12 is an exploded perspective view of the illumination light emitter 71 and the indication light emitter 72 as viewed from the upper left rear. FIG. 13 is an exploded perspective view of the illumination light emitter 71 and the indication light emitter 72 as viewed from the lower right front. FIG. 14 is a longitudinal sectional view of the illumination light emitter 71 and the indication light emitter 72. FIG. 15 is a cross-sectional view of the illumination light emitter 71 and the indication light emitter 72. FIG. 15 is a cross-sectional view taken along line B-B in FIG. 14 as viewed in the direction indicated by arrows. FIG. 16 is a longitudinal sectional view of the illumination light emitter 71. FIG. 17 is a cross-sectional view of the indication light emitter 72. FIG. 18 is a partially enlarged cross-sectional view of the indication light emitter 72.

The illumination light emitter 71 includes multiple light-emitting elements 73 (first light-emitting elements) and a light-transmissive lens 74 (first lens). The indication light emitter 72 includes multiple light-emitting elements 75 (second light-emitting elements), a light-diffusing lens 76, and a cylindrical lens 77 (second lens). The electric work machine 1 includes a substrate 78.

Figure 19:
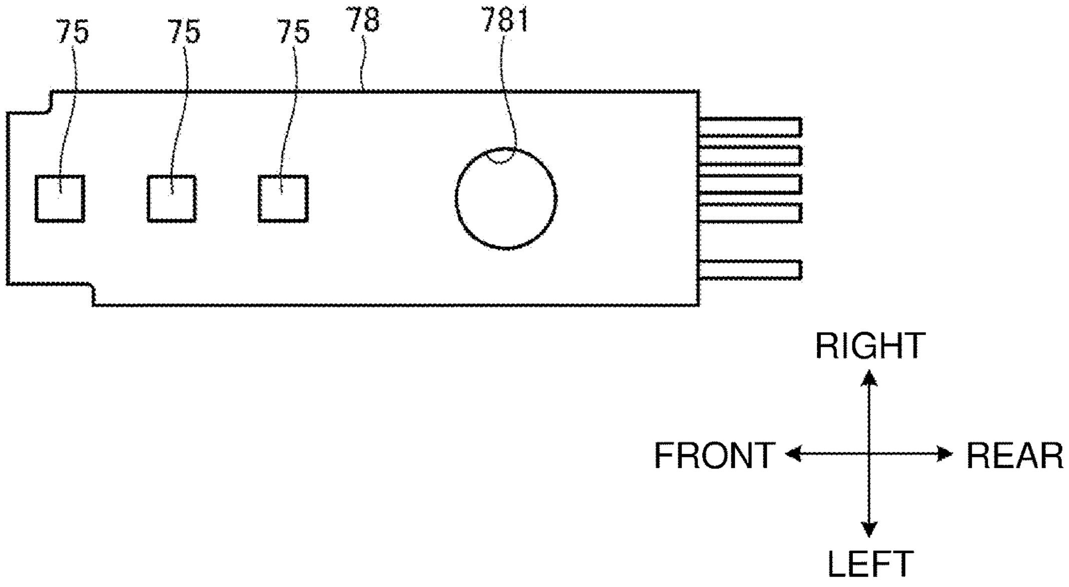
FIG. 19 is a top view of a substrate in the first embodiment.
Figure 20:
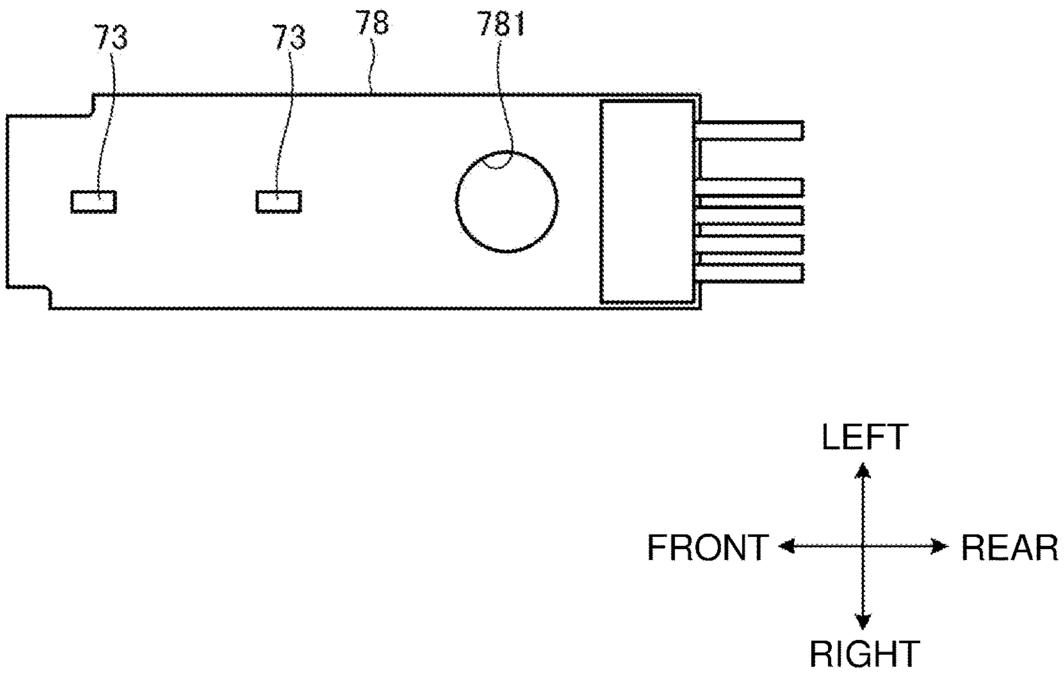
FIG. 20 is a bottom view of the substrate in the first embodiment.

FIG. 19 is a top view of the substrate 78 in the present embodiment. FIG. 20 is a bottom view of the substrate 78.

The light-emitting elements 73 are located on the front surface (lower surface) of the substrate 78. The light-emitting elements 75 are located on the back surface (upper surface) of the substrate 78. The substrate 78 has a screw through-hole 781 in its rear portion.

The light-emitting elements 73 are light-emitting diodes (LEDs). The multiple (two in the present embodiment) light-emitting elements 73 are arranged in the front-rear direction on the lower surface of the substrate 78.

The light-transmissive lens 74 transmits light emitted from the light-emitting elements 73. The light-transmissive lens 74 is located below the substrate 78. The light-transmissive lens 74 faces the light-emitting elements 73. The light-transmissive lens 74 includes a bent portion 741 and a flat portion 742. The front light-emitting element 73 faces the bent portion 741. The rear light-emitting element 73 faces the flat portion 742. The bent portion 741 is bent upward toward the front. Light emitted from the light-emitting elements 73 and transmitted through the bent portion 741 illuminates a position ahead of the light-transmissive lens 74. Light transmitted through the bent portion 741 illuminates the output shaft 12 or a screwdriver bit held on the output shaft 12. Light emitted from the light-emitting elements 73 and transmitted through the flat portion 742 illuminates a position below the light-transmissive lens 74.

The light-emitting elements 75 are LEDs. The multiple (three in the present embodiment) light-emitting elements 75 are arranged in the front-rear direction on the upper surface of the substrate 78.

The light-diffusing lens 76 and the cylindrical lens 77 are located between the motor 4 and the output shaft 12 in the front-rear direction. The light-diffusing lens 76 is located above the substrate 78. The cylindrical lens 77 is located above the light-diffusing lens 76. The light-diffusing lens 76 is located between the light-emitting elements 75 and the cylindrical lens 77 in the vertical direction.

The light-diffusing lens 76 has an incident surface 761 and an emission surface 762. The incident surface 761 faces the light-emitting elements 75. The emission surface 762 faces the cylindrical lens 77. The incident surface 761 and the emission surface 762 are substantially flat. The incident surface 761 is substantially parallel to the emission surface 762. The incident surface 761 has an incident groove 763. The incident groove 763 is recessed upward from the incident surface 761. The emission surface 762 has an emission groove 764. The emission groove 764 is recessed downward from the emission surface 762. The incident groove 763 and the emission groove 764 are elongated in the front-rear direction. In each of the front-rear and lateral directions, the position of the incident groove 763 is aligned with the position of the emission groove 764.

Each of the incident groove 763 and the emission groove 764 contains a triangular groove. In the cross section perpendicular to the rotation axis AX, the incident groove 763 has an angle $\alpha$ smaller than an angle $\beta$ of the emission groove 764. For example, the angle $\alpha$ is 90 degrees, and the angle $\beta$ is 115 degrees. The incident groove 763 has a depth Da greater than a depth Db of the emission groove 764. For example, the depth Da is 0.5 mm, and the depth Db is 0.3 mm.

The cylindrical lens 77 transmits light from the light-emitting elements 75. The cylindrical lens 77 surrounds the clutch case 5. The cylindrical lens 77 is supported by the clutch case 5 in a rotatable manner. The cylindrical lens 77 is located to have its central axis aligned with the rotation axis AX of the motor 4. The cylindrical lens 77 has its central axis extending in the front-rear direction.

Figure 21:
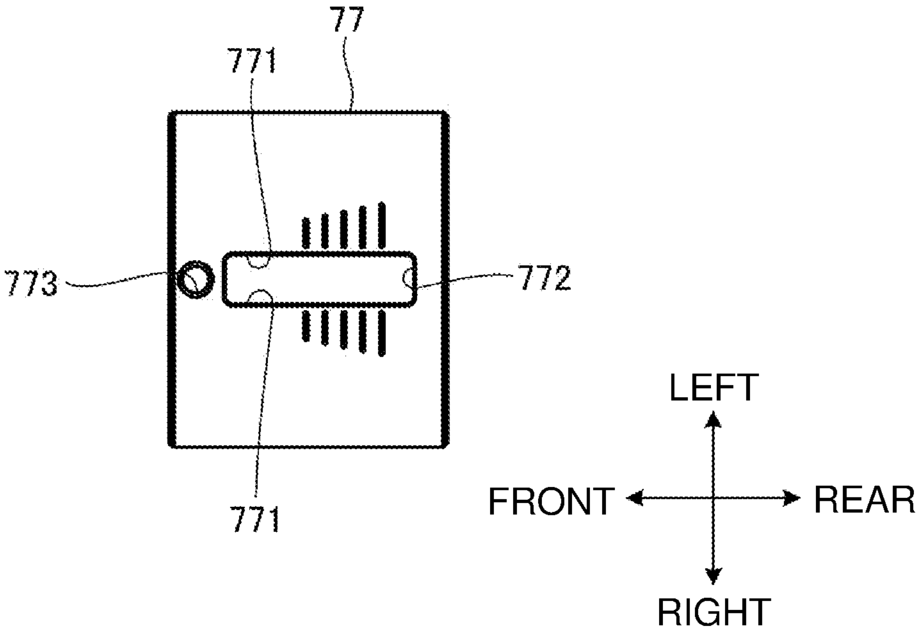
FIG. 21 is a bottom view of a cylindrical lens in the first embodiment.

FIG. 21 is a bottom view of the cylindrical lens 77. The cylindrical lens 77 has an axial dimension La smaller than a radial dimension Wa of the cylindrical lens 77.

The cylindrical lens 77 includes an incident portion 771 that receives light from the light-emitting elements 75. The cylindrical lens 77 has a recess 772. The recess 772 is recessed radially inward from the outer circumferential surface of the cylindrical lens 77. The recess 772 is recessed upward from the bottom of the outer circumferential surface of the cylindrical lens 77. The recess 772 in the present embodiment is an opening portion through the outer circumferential surface and the inner circumferential surface of the cylindrical lens 77. In the example described below, the recess 772 will be referred to as an opening portion 772 for convenience.

The opening portion 772 is a through-hole extending through the outer circumferential surface and the inner circumference of the cylindrical lens 77. The opening portion 772 is elongated in a direction parallel to the central axis of the cylindrical lens. The incident portion 771 includes an inner surface of the opening portion 772. The cylindrical lens 77 has a screw through-hole 773. The screw through-hole 773 is located frontward from the opening portion 772.

The light-emitting elements 75 are located radially outward from the cylindrical lens 77. The light-emitting elements 75 illuminate the cylindrical lens 77 through the light-diffusing lens 76. Light emitted from the light-emitting elements 75 is incident on the incident groove 763 on the light diffusion lens 76. At least a part of light incident on the incident groove 763 from the light-emitting elements 75 is emitted through the light-diffusing lens 76 and then through the emission groove 764. Light emitted through the emission groove 764 is incident on the incident portion 771 in the cylindrical lens 77. At least a part of light incident on the incident portion 771 travels through the cylindrical lens 77 and is emitted radially outward through the outer circumferential surface of the cylindrical lens 77.

The electric work machine 1 includes the clutch 6, the clutch case 5, and a substrate holder 79. The clutch 6 is located between the motor 4 and the output shaft 12 in the front-rear direction. The clutch case 5 accommodates the clutch 6. The substrate holder 79 holds the substrate 78.

The substrate holder 79 holds the light-transmissive lens 74. The light-transmissive lens 74 is located below the substrate 78. The substrate holder 79 has a screw through-hole 791, a screw through-hole 792, and an opening 793. The screw through-hole 792 is located rearward from the screw through-hole 791. The opening 793 is located between the screw through-hole 791 and the screw through-hole 792 in the front-rear direction. The substrate 78 is at least partially received in the opening 793. Light emitted from the light-emitting elements 73 passes through the light-transmissive lens 74 and is emitted through the opening 793.

The substrate holder 79 has its front portion fastened to the clutch case 5 with a screw 80. The cylindrical lens 77 is fastened to the clutch case 5 with the screw 80. The screw 80 is placed through the screw through-hole 791 and the screw through-hole 773, and then into a threaded hole 82 in the clutch case 5. The substrate holder 79, the cylindrical lens 77, and the clutch case 5 are fastened together with the screw 80.

The substrate holder 79 has its rear portion fastened to the clutch case 5 with a screw 81. The screw 81 is placed through the screw through-hole 792 and the screw through-hole 781, and then into a threaded hole 83 in the clutch case 5. The substrate holder 79, the substrate 78, and the clutch case 5 are fastened together with the screw 81.

The substrate 78 is fastened to the clutch case 5. The substrate holder 79 holding the substrate 78 is fastened to the clutch case 5 with the screws 80 and 81. The substrate 78 is fastened to the clutch case 5 with the substrate holder 79 between them. The cylindrical lens 77 is fastened to the clutch case 5. The cylindrical lens 77 is fastened to the clutch case 5 with the screw 80. The substrate holder 79 and the cylindrical lens 77 are fastened to the clutch case 5 with the screw 80.

The operation of the electric work machine 1 will now be described. The operator moves the trigger lever 19 upward with a screwdriver bit attached to the output shaft 12 pressed against a screw. In response to the trigger switch 18 being turned on, a drive current is supplied from the battery pack 13 to the motor 4 through the controller 15 to drive the motor 4. The controller 15 supplies a drive current to each of the multiple coils 25 in response to a detection signal transmitted from the rotation detector in the sensor circuit board 30. This rotates the rotor 22.

When the rotor shaft 26 rotates as the rotor 22 rotates, a rotational force of the rotor shaft 26 is transmitted to the spindle 48 through the reducer 53. When the load torque transmitted from the output shaft 12 to the spindle 48 is less than or equal to the set torque, the clutch 6 is in the engagement state. The rotational force of the rotor shaft 26 is thus transmitted to the spindle 48 through the reducer 53 and the clutch 6 to rotate the spindle 48. The countershaft 57 and the output shaft 12 then rotate to rotate the screwdriver bit. Thus, the screwing operation proceeds.

In response to the trigger switch 18 being turned on, the controller 15 emits illumination light from the illumination light emitter 71. As the rotor shaft 26 rotates, the centrifugal fan 38 rotates together with the rotor shaft 26. As the centrifugal fan 38 rotates, air flows into the motor compartment 3 through the inlets 39, cools the motor 4, and is then discharged through the outlets 40.

As the screwing operation proceeds, the screw is tightened into the workpiece with a target tightening force. When the load torque transmitted from the output shaft 12 to the spindle 48 exceeds the set torque, the front cam 47 moves forward to cause the clutch 6 to enter the release state. This stops rotation of the output shaft 12.

When the clutch 6 is in the release state, the sensor board 62 holding the magnet 65 moves forward together with the front cam 47. The detector 67 detects the advancement of the magnet 65. In this case, the controller 15 determines that the status of the screwing operation is appropriate based on the detection signal from the detector 67, and causes the indication light emitter 72 to emit green indication light. In response to the motor 4 being stopped before the detector 67 detects the advancement of the magnet 65, the controller 15 determines that the status of the screwing operation is defective, and causes the indication light emitter 72 to emit red indication light.

In response to the detector 67 detecting the advancement of the magnet 65, the controller 15 causes the indication light emitter 72 to emit green indication light and causes the sound output element 70 to output the first indication sound. In response to the motor 4 being stopped before the detector 67 detects the advancement of the magnet 65, the controller 15 causes the indication light emitter 72 to emit, for example, red indication light, and causes the sound output element 70 to output the second indication sound.

Adjustment of Clutch

Figure 22:
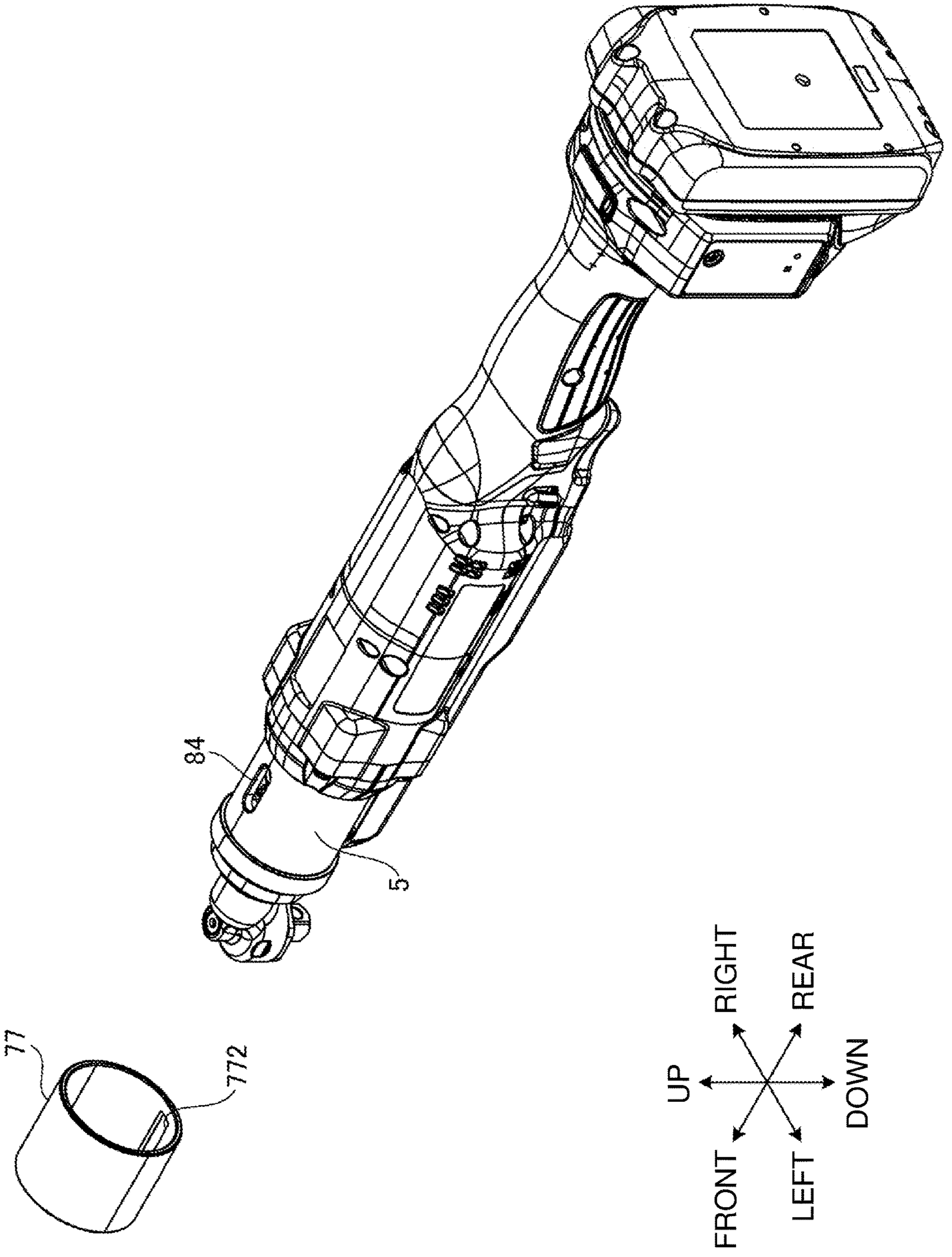
FIG. 22 is an exploded perspective view of the electric work machine according to the first embodiment as viewed from the upper left rear.
Figure 23:
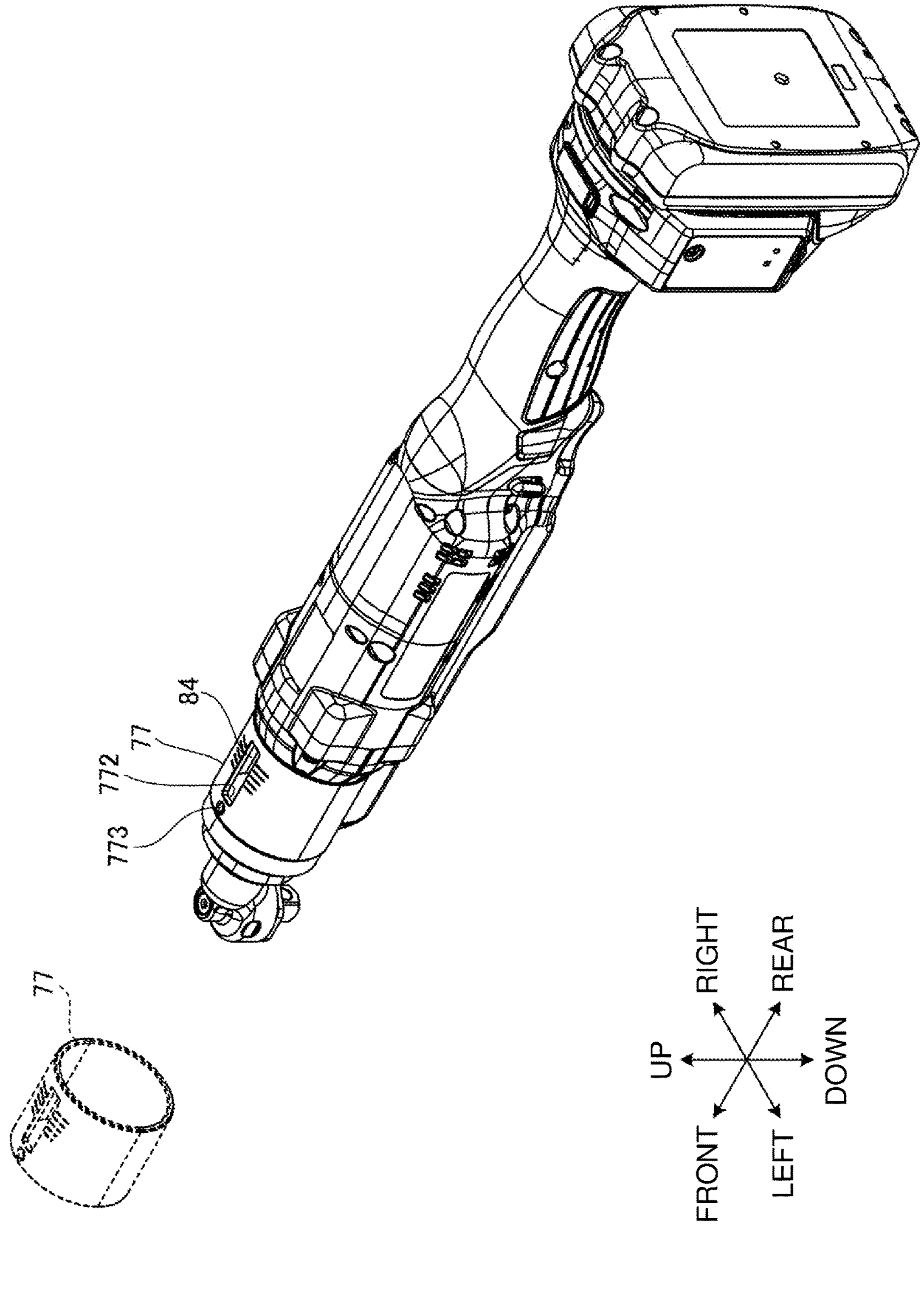
FIG. 23 is an exploded perspective view of the electric work machine according to the first embodiment as viewed from the upper left rear.

FIGS. 22 and 23 are exploded perspective views of the electric work machine 1 according to the present embodiment as viewed from the upper left rear.

As shown in FIG. 22, the clutch case 5 has an opening 84. The opening 84 can receive a tool for adjusting the clutch 6. The opening 84 is located in an upper portion of the clutch case 5. The cylindrical lens 77 is rotatable around the clutch case 5 to cover or uncover the opening 84.

To perform a screwing operation, for example, the cylindrical lens 77 is fastened to the clutch case 5 with the screws 80 and 81 with the opening 84 covered by the cylindrical lens 77 as shown in FIGS. 1 to 8. This reduces foreign objects entering the clutch case 5 from outside.

As shown in FIG. 23, when the tool for adjusting the clutch 6 is placed into the opening 84, the cylindrical lens 77 is adjusted in the rotation direction to uncover the opening 84. The cylindrical lens 77 is adjusted in the rotation direction to have the opening portion 772 aligned with the opening 84. The operator can adjust the clutch 6 by placing the tool into the clutch case 5 through the opening 84.

The electric work machine 1 according to the present embodiment may include the motor 4, the output shaft 12 being the tool holder rotatable with a rotational force generated by the motor 4, the cylindrical lens 77 located between the motor 4 and the output shaft 12, and the light-emitting elements 75 located radially outward from the cylindrical lens 77 to illuminate the cylindrical lens 77.

In the above structure, the cylindrical lens 77 emits indication light to improve the viewability of the indication light emitter 72.

The cylindrical lens 77 in the present embodiment may have the central axis aligned with the rotation axis AX of the motor 4.

This improves the viewability of the indication light emitter 72.

In the present embodiment, the cylindrical lens 77 may have an axial dimension smaller than the radial dimension of the cylindrical lens 77.

This reduces an increase in the axial dimension of the electric work machine 1.

Light emitted from the light-emitting elements 75 is incident on the inner surface of the opening portion 772.

In the present embodiment, the multiple light-emitting elements 75 may be arranged in a direction parallel to the central axis of the cylindrical lens 77.

This reduces uneven emission of light emitted through the cylindrical lens 77 in the axial direction.

In the present embodiment, the cylindrical lens 77 may include the opening portion 772 through its outer circumferential surface and inner circumferential surface. Light from the light-emitting elements 75 may be incident on the opening portion 772.

This causes light emitted from the light-emitting elements 75 to be incident on the inner surface of the opening portion 772.

In the present embodiment, at least a part of light incident on the inner surface of the opening portion 772 may travel inside the cylindrical lens 77 and be emitted radially outward through the outer circumferential surface of the cylindrical lens 77.

Light emitted from the light-emitting elements 75 is incident on the inner surface of the opening portion 772 in the cylindrical lens 77 and is emitted through the outer circumferential surface of the cylindrical lens 77 to improve the viewability of the indication light emitter 72.

The electric work machine 1 according to the present embodiment may include the light-diffusing lens 76 between the light-emitting elements 75 and the cylindrical lens 77.

This causes light diffused by the light-diffusing lens 76 to be incident on the cylindrical lens 77.

The light-diffusing lens 76 in the present embodiment may have the incident groove 763 on the incident surface 761 facing the light-emitting elements 75 and the emission groove 764 on the emission surface 762 facing the cylindrical lens 77. At least a part of light incident on the incident groove 763 from the light-emitting elements 75 is emitted through the emission groove 764 before being incident on the cylindrical lens 77.

This causes light diffused by the light-diffusing lens 76 to be incident on the cylindrical lens 77.

In the present embodiment, the incident groove 763 and the emission groove 764 may be elongated in a direction parallel to the central axis of the cylindrical lens 77.

This causes light diffused by the light-diffusing lens 76 to be incident on the cylindrical lens 77.

In the present embodiment, each of the incident groove 763 and the emission groove 764 may include a triangular groove. In a cross section perpendicular to the central axis, the incident groove 763 may have the angle $\beta$ smaller than the angle $\alpha$ of the emission groove 764.

This causes light diffused by the light-diffusing lens 76 to be incident on the cylindrical lens 77.

In the present embodiment, the incident groove 763 may have the depth Da greater than the depth Db of the emission groove 764.

This causes light diffused by the light-diffusing lens 76 to be incident on the cylindrical lens 77.

The electric work machine 1 according to the present embodiment may include the clutch 6 between the motor 4 and the output shaft 12, and the clutch case 5 accommodating the clutch 6. The cylindrical lens 77 may surround the clutch case 5.

This improves the viewability of the indication light emitter 72.

The cylindrical lens 77 in the present embodiment may be supported by the clutch case 5 in a rotatable manner.

This allows rotation of the cylindrical lens 77.

In the present embodiment, the clutch case 5 may have the opening 84 to receive a tool to adjust the clutch 6. The cylindrical lens 77 may be rotatable to cover or uncover the opening 84.

The cylindrical lens 77 is thus used as a cover to cover the opening 84.

The electric work machine 1 according to the present embodiment may include the screw 80 fastening the cylindrical lens 77 to the clutch case 5 with the opening 84 covered by the cylindrical lens 77.

The cylindrical lens 77 is thus used as a cover to cover the opening 84.

The electric work machine 1 according to the present embodiment may include the substrate 78 supporting the light-emitting elements 75 and the substrate holder 79 holding the substrate 78. The substrate holder 79 and the cylindrical lens 77 may be fastened to the clutch case 5 with the screw 80.

The substrate holder 79 and the cylindrical lens 77 are thus fastened to the clutch case 5 with the screw 80.

The electric work machine 1 according to the present embodiment may include the motor 4, the output shaft 12 being the tool holder rotatable with a rotational force generated by the motor 4, the illumination light emitter (first light emitter) 71 including the light-emitting elements (first light-emitting elements) 73, the indication light emitter (second light emitter) 72 including the light-emitting elements (second light-emitting elements) 75, and the substrate 78. The light-emitting elements 73 may be located on the front surface of the substrate 78, and the light-emitting elements 75 may be located on the back surface of the substrate 78.

The light-emitting elements 73 are located on the front surface of the substrate 78, and the light-emitting elements 75 are located on the back surface of the substrate 78. The electric work machine 1 with this structure is compact.

The illumination light emitter 71 in the present embodiment may emit illumination light that illuminates at least the tool held on the output shaft 12.

This structure illuminates the tool with illumination light.

The indication light emitter 72 in the present embodiment may emit indication light indicating at least an operating state.

This allows the indication light to indicate the operating state of the electric work machine 1.

The electric work machine 1 according to the present embodiment may include the clutch 6 between the motor 4 and the output shaft 12, and the clutch case 5 accommodating the clutch 6. The substrate 78 may be fastened to the clutch case 5.

The electric work machine 1 with this structure is compact.

The electric work machine 1 according to the present embodiment may include the substrate holder 79 holding the substrate 78 and the screw 81 fastening the substrate holder 79 to the clutch case 5. The substrate 78 may be fastened to the clutch case 5 with the substrate holder 79 between the substrate 78 and clutch case 5.

The electric work machine 1 with this structure is compact.

The illumination light emitter 71 in the present embodiment may include the light-transmissive lens 74 as the first lens to transmit light from the light-emitting elements 73. The light-transmissive lens 74 may be held by the substrate holder 79.

The electric work machine 1 with this structure is compact.

In the present embodiment, the multiple light-emitting elements 73 may be arranged in a direction parallel to the rotation axis AX of the motor 4.

This reduces uneven emission of light emitted through the light-transmissive lens 74 in the axial direction.

The electric work machine 1 according to the present embodiment may include the clutch 6 between the motor 4 and the output shaft 12, and the clutch case 5 accommodating the clutch 6. The indication light emitter 72 may include the cylindrical lens 77 as the second lens to transmit light from the light-emitting elements 75. The cylindrical lens 77 may surround the clutch case 5.

This improves the viewability of the indication light emitter 72.

The electric work machine 1 according to the present embodiment may include the screw 80 fastening the cylindrical lens 77 to the clutch case 5.

This fastens the cylindrical lens 77.

The electric work machine 1 according to the present embodiment may include the substrate holder 79 holding the substrate holder 78. The substrate holder 79 and the cylindrical lens 77 may be fastened to the clutch case 5 with the screw 80.

This fastens the substrate holder 79 and the cylindrical lens 77.

In the present embodiment, the multiple light-emitting elements 75 may be arranged in a direction parallel to the rotation axis AX of the motor 4.

This reduces uneven emission of light emitted through the cylindrical lens 77 in the axial direction.

Second Embodiment

A second embodiment will be described. Like reference numerals hereafter denote like or corresponding components in the above embodiment. Such components will be described briefly or will not be described.

Figure 24:
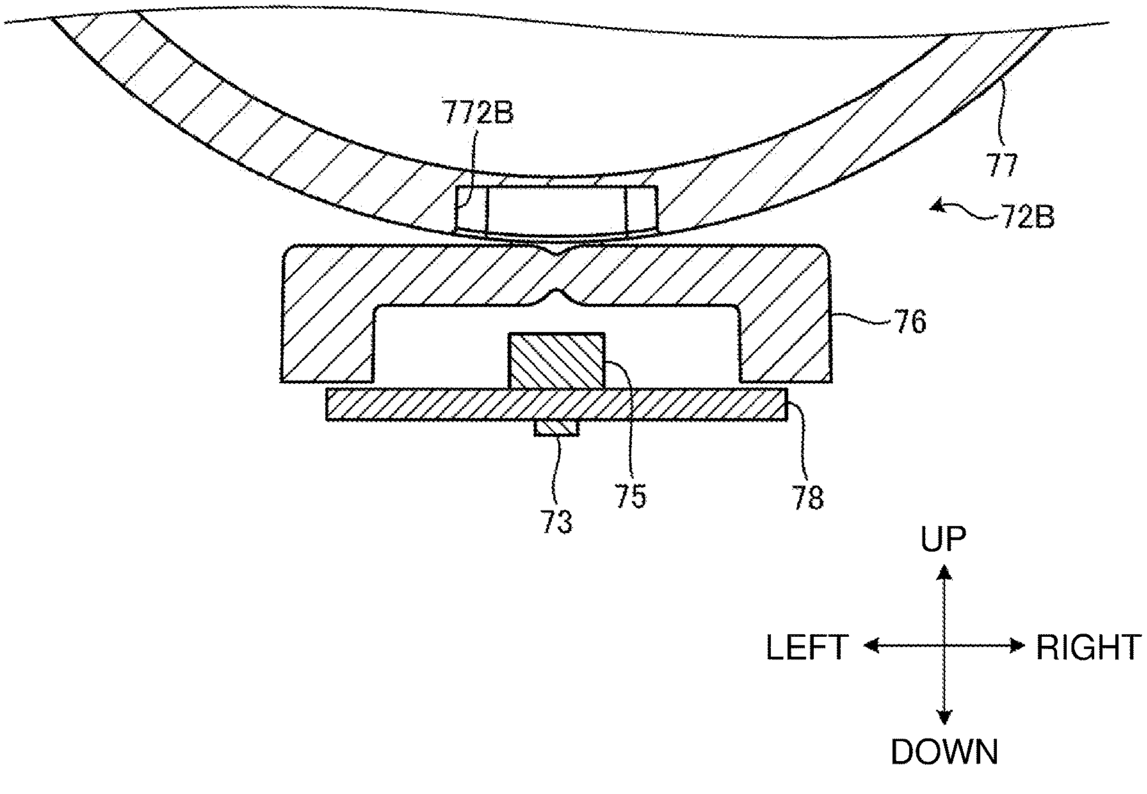
FIG. 24 is a partially enlarged cross-sectional view of an indication light emitter in a second embodiment.

FIG. 24 is a partially enlarged cross-sectional view of an indication light emitter 72B in the present embodiment. In the above embodiment, the cylindrical lens 77 has the recess 772 including the opening portion. As shown in FIG. 24, a recess 772B may be recessed upward from the bottom of the outer circumferential surface of the cylindrical lens 77, rather than through the outer circumferential surface and the inner circumferential surface of the cylindrical lens 77. The recess 772 may have inner surfaces to receive light from the light-emitting element 75.

Third Embodiment

A third embodiment will be described. Like reference numerals hereafter denote like or corresponding components in the above embodiments. Such components will be described briefly or will not be described.

Figure 25:
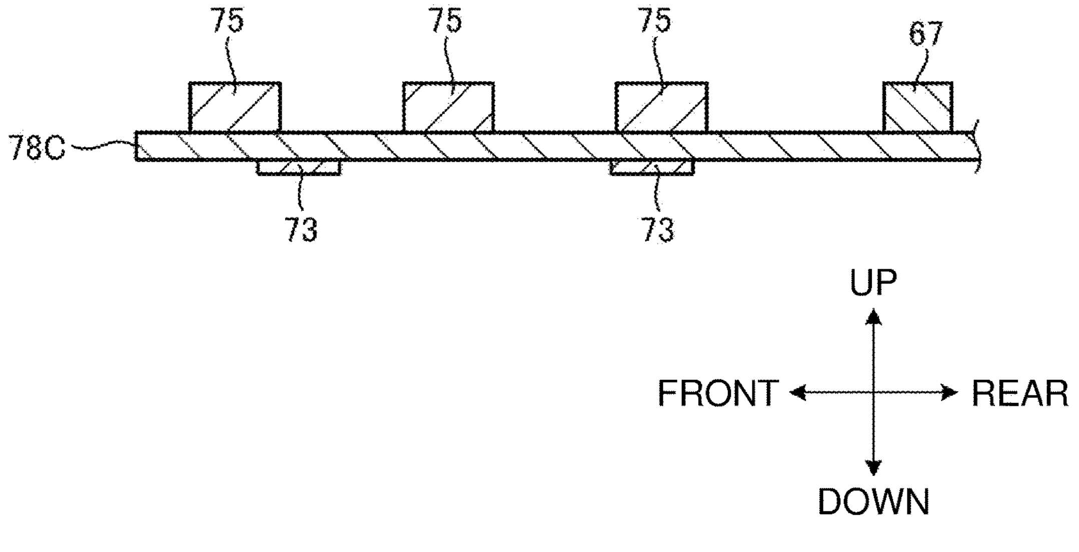
FIG. 25 is a left view of a substrate in a third embodiment.

FIG. 25 is a left view of a substrate 78C in the present embodiment. In the above embodiments, to detect the release state of the clutch 6, the detector 67 is located on the detection substrate 66 different from the substrate 78. As shown in FIG. 25, the detector 67 may be located on the substrate 78C on which the light-emitting elements 73 are located. In the example shown in FIG. 25, the light-emitting elements 73 are located on the lower surface (front surface) of the substrate 78C. The detector 67 is located on the upper surface (back surface) of the substrate 78C. The detector 67 is aligned in the front-rear direction with at least a part of the magnet 65, which is at the retracted position. As shown in FIG. 25, the light-emitting elements 75 may be located on the upper surface of the substrate 78C. The detector 67 is located rearward from the light-emitting elements 75.

In the above embodiments, the detection target for the detector 67 is the clutch 6. More specifically, the detection target for the detector 67 is the magnet 65 movable in synchronization with the front cam 47 in the clutch 6. The detector 67 is a magnetic sensor such as a Hall IC that can detect movement of the magnet 65. The detector 67 may be a photointerrupter. The photointerrupter may detect, for example, movement of the sensor board 62.

Fourth Embodiment

A fourth embodiment will be described. Like reference numerals hereafter denote like or corresponding components in the above embodiments. Such components will be described briefly or will not be described.

Figure 26:
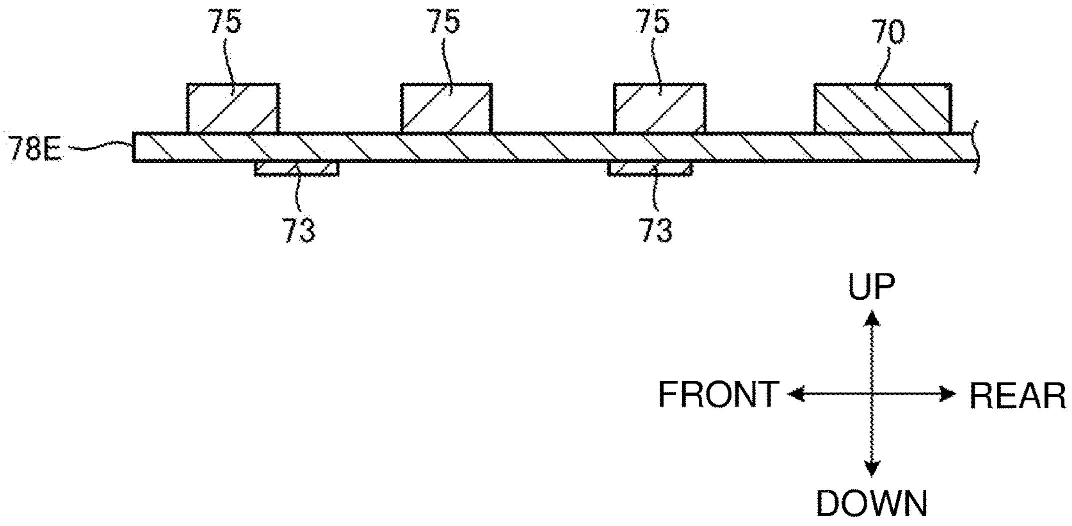
FIG. 26 is a left view of a substrate in a fourth embodiment.

FIG. 26 is a left view of a substrate 78D in the present embodiment. As shown in FIG. 26, the sound output element (indicator) 70 may be located on the substrate 78D on which the light-emitting elements 73 are located. In the example shown in FIG. 26, the light-emitting elements 73 are located on the lower surface (front surface) of the substrate 78D. The sound output element 70 is located on the upper surface (back surface) of the substrate 78D. In the example shown in FIG. 26, the light-emitting elements 75 are located on the upper surface of the substrate 78D together with the sound output element 70. The light-emitting elements (indicators) 75 emit indication light. The light-emitting elements 73 may be eliminated from the substrate 78D. The light-emitting elements 75 may be located on the upper surface of the substrate 78D. The sound output element 70 may be located on the lower surface of the substrate 78D.

Fifth Embodiment

A fifth embodiment will be described. Like reference numerals hereafter denote like or corresponding components in the above embodiments. Such components will be described briefly or will not be described.

Figure 27:
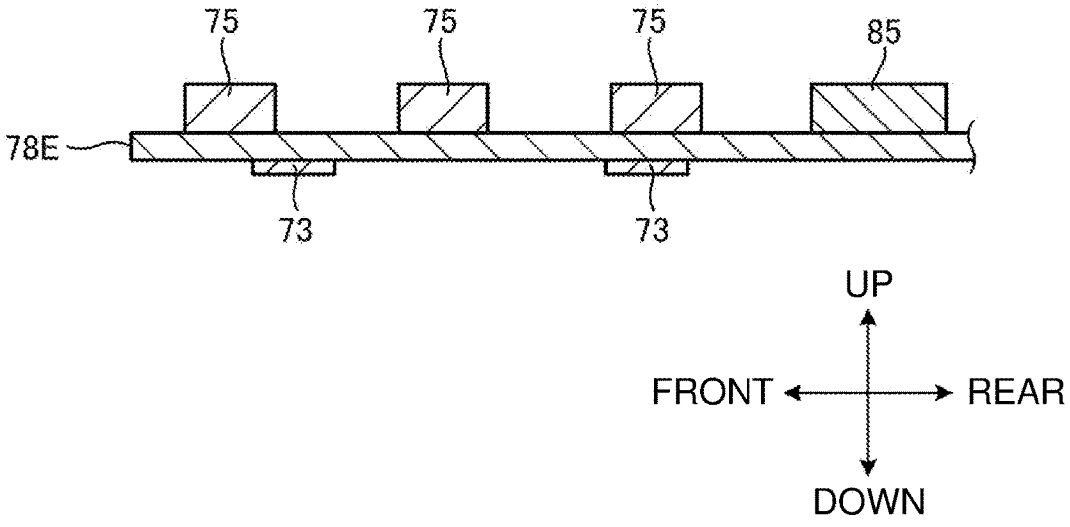
FIG. 27 is a left view of a substrate in a fifth embodiment.

FIG. 27 is a left view of a substrate 78E in the present embodiment. As shown in FIG. 27, a vibration element (indicator) 85 may be located on the substrate 78E on which the light-emitting elements 73 are located. The vibration element 85 generates indication vibration. The vibration element 85 is, for example, a piezoelectric element. In the example shown in FIG. 27, the light-emitting elements 73 are located on the lower surface (front surface) of the substrate 78E. The vibration element 85 is located on the upper surface (back surface) of the substrate 78E. In the example shown in FIG. 27, the light-emitting elements 75 are located on the upper surface of the substrate 78E together with the vibration element 85. The light-emitting elements (indicators) 75 emit indication light. The light-emitting elements 73 may be eliminated from the substrate 78E. The light-emitting elements 75 may be located on the upper surface of the substrate 78E. The vibration element 85 may be located on the lower surface of the substrate 78E.

Sixth Embodiment

A sixth embodiment will be described. Like reference numerals hereafter denote like or corresponding components in the above embodiments. Such components will be described briefly or will not be described.

Figure 28:
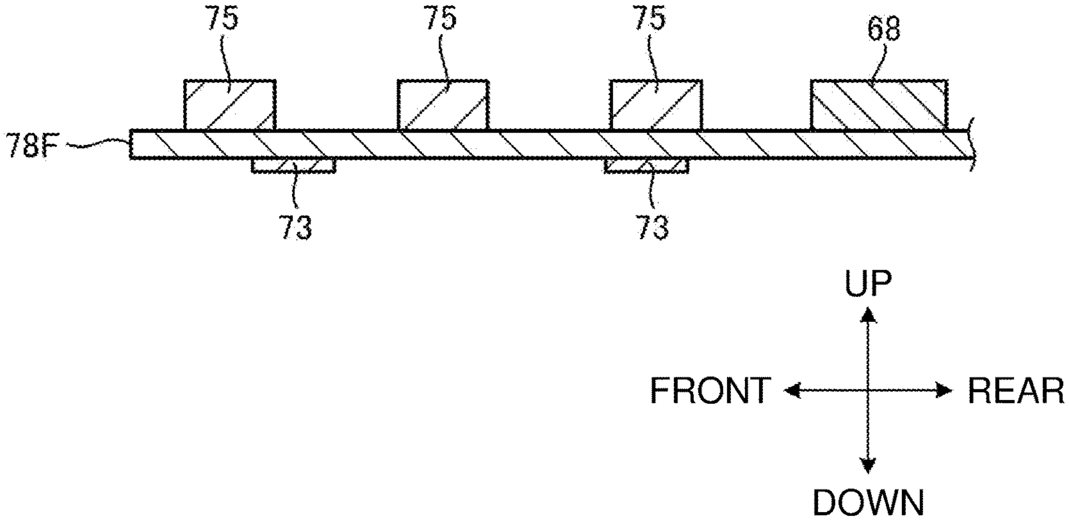
FIG. 28 is a left view of a substrate in a sixth embodiment.

FIG. 28 is a left view of a substrate 78F in the present embodiment. As shown in FIG. 28, the external connection terminal 68 may be located on the substrate 78F on which the light-emitting elements 73 are mounted. The external connection terminal 68 is connected to an external device. The external connection terminal 68 is, for example, a USB terminal. In the example shown in FIG. 28, the light-emitting elements 73 are located on the lower surface (front surface) of the substrate 78F. The external connection terminal 68 is located on the upper surface (back surface) of the substrate 78F. In the example shown in FIG. 28, the light-emitting elements 75 are located on the upper surface of the substrate 78F together with the external connection terminal 68. The light-emitting elements 73 may be eliminated from the substrate 78F. The light-emitting elements 75 may be located on the upper surface of the substrate 78F. The external connection terminal 68 may be located on the lower surface of the substrate 78F.

The external connection terminal 68 is not limited to a USB terminal. The external connection terminal 68 may be a communication terminal that can wirelessly communicate with an external device.

Seventh Embodiment

A seventh embodiment will be described. Like reference numerals hereafter denote like or corresponding components in the above embodiments. Such components will be described briefly or will not be described.

Figure 29:
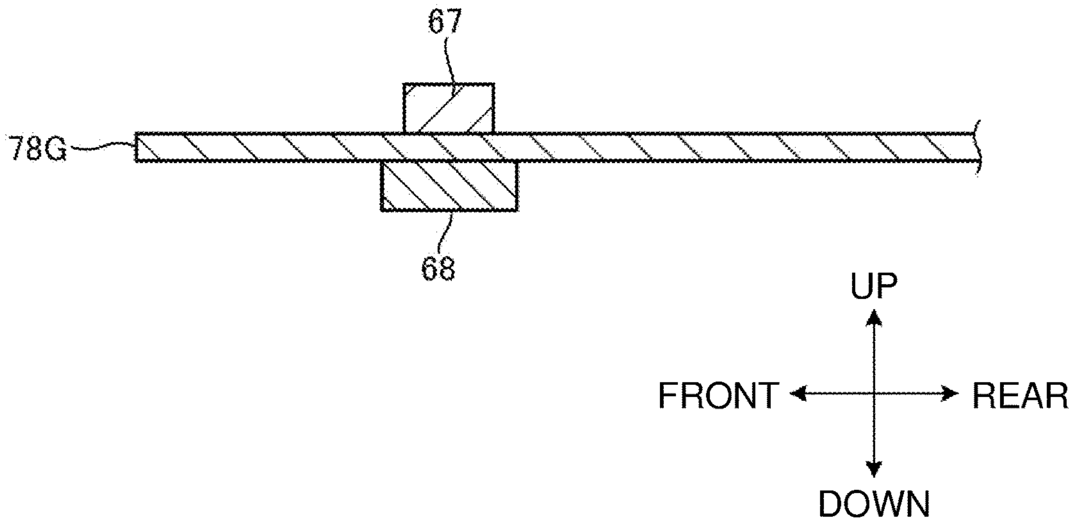
FIG. 29 is a left view of a substrate in a seventh embodiment.

FIG. 29 is a left view of a substrate 78G in the present embodiment. As shown in FIG. 29, the detector 67 and the external connection terminal 68 may be located on the single substrate 78G. In the example shown in FIG. 29, the detector 67 is located on the upper surface of the substrate 78G. The external connection terminal 68 is located on the lower surface of the substrate 78G. Either the light-emitting elements 73 or the light-emitting elements 75 or both described in the above embodiments may be located on the substrate 78G.

Eighth Embodiment

An eighth embodiment will be described. Like reference numerals hereafter denote like or corresponding components in the above embodiments. Such components will be described briefly or will not be described.

Figure 30:
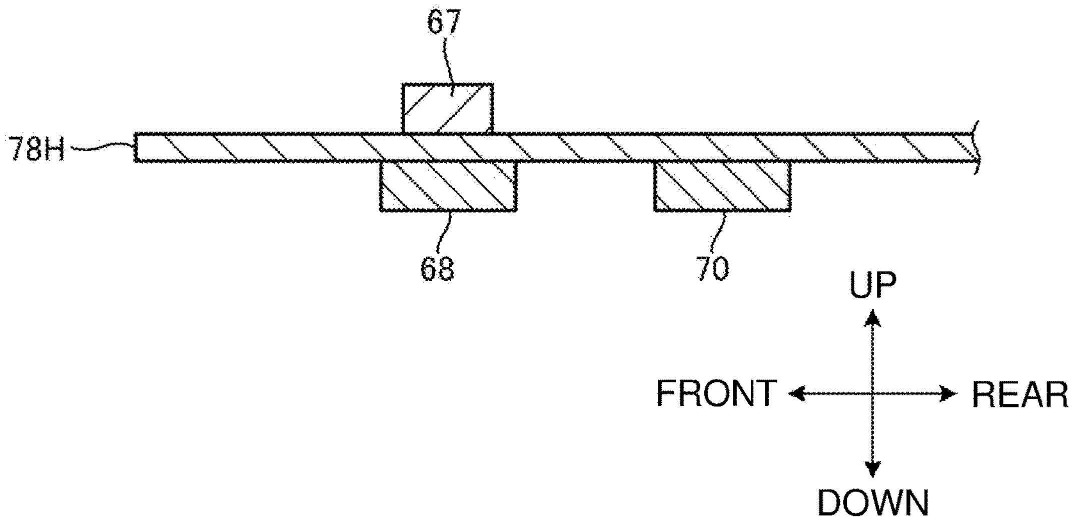
FIG. 30 is a left view of a substrate in an eighth embodiment.

FIG. 30 is a left view of a substrate 78H in the present embodiment. As shown in FIG. 30, the detector 67, the external connection terminal 68, and the sound output element (indicator) 70 may be located on the single substrate 78H. In the example shown in FIG. 30, the detector 67 is located on the upper surface of the substrate 78H. The external connection terminal 68 and the sound output element 70 are located on the lower surface of the substrate 78H. Instead of or in addition to the sound output element 70, the vibration element 85 may be located on the substrate 78H. Either the light-emitting elements 73 or the light-emitting elements 75 or both described in the above embodiments may be located on the substrate 78H.

Ninth Embodiment

A ninth embodiment will be described. Like reference numerals hereafter denote like or corresponding components in the above embodiments. Such components will be described briefly or will not be described.

Figure 31:
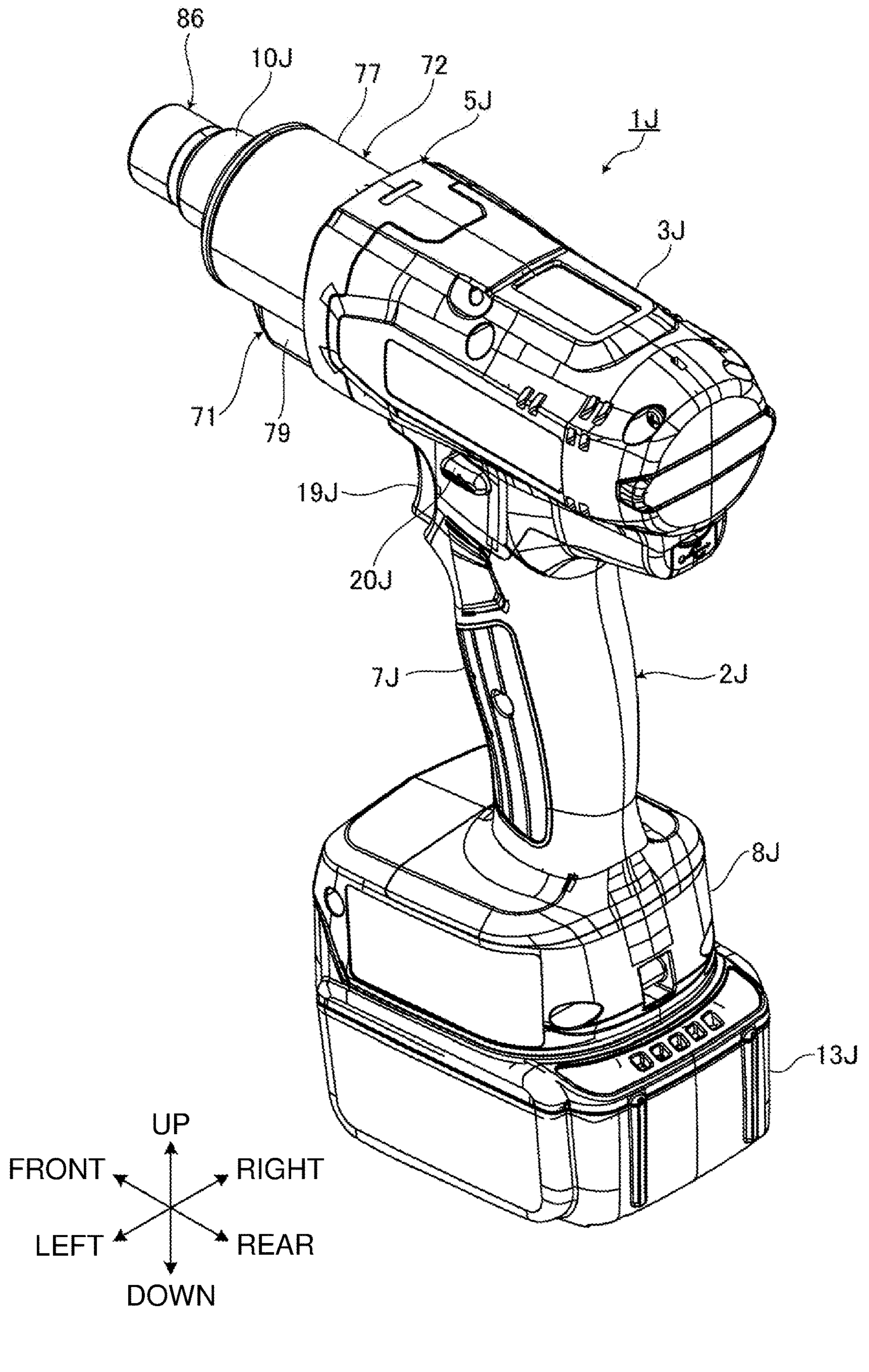
FIG. 31 is a perspective view of an electric work machine according to a ninth embodiment as viewed from the upper left rear.
Figure 32:
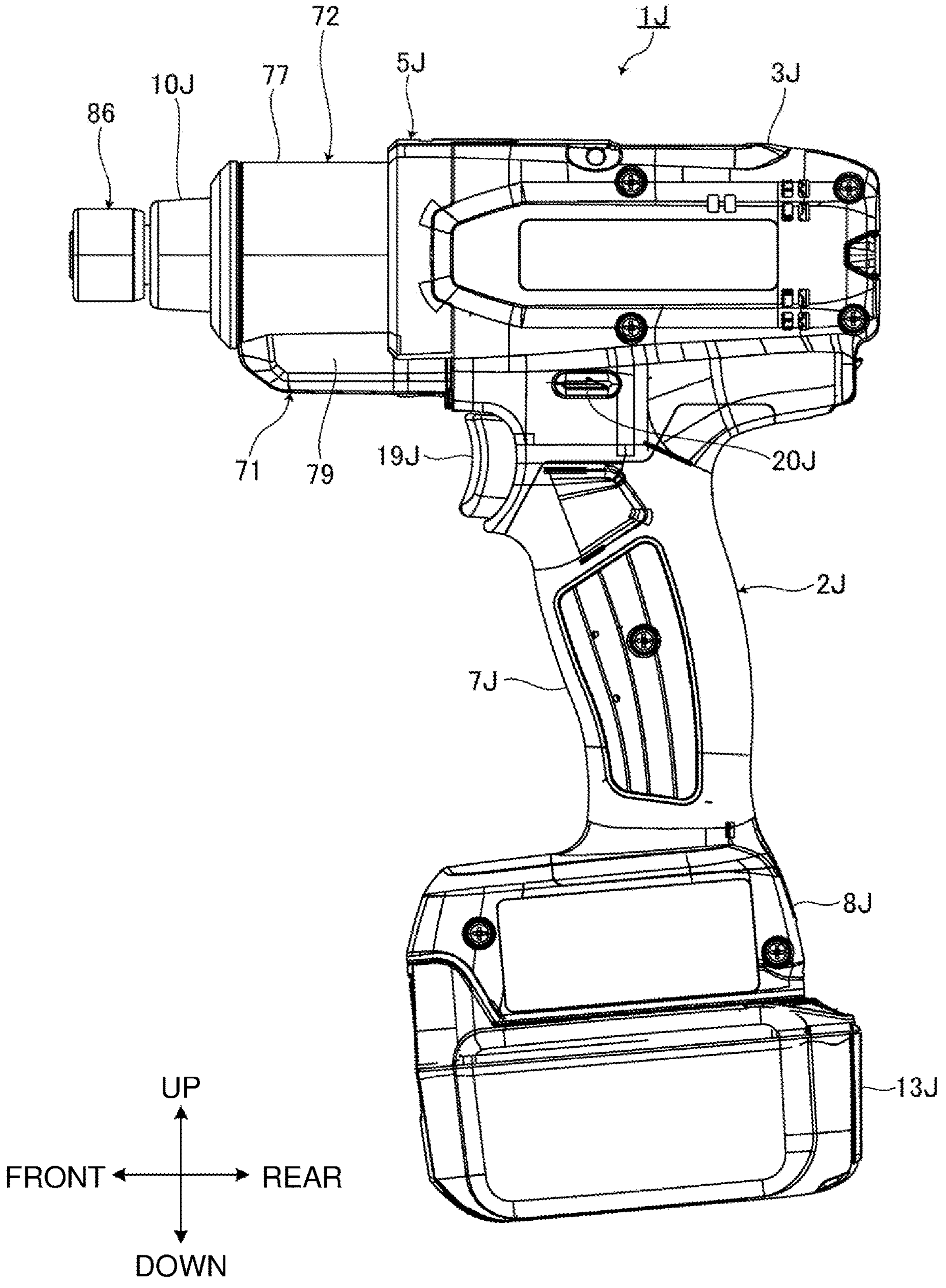
FIG. 32 is a left view of the electric work machine according to the ninth embodiment.
Figure 33:
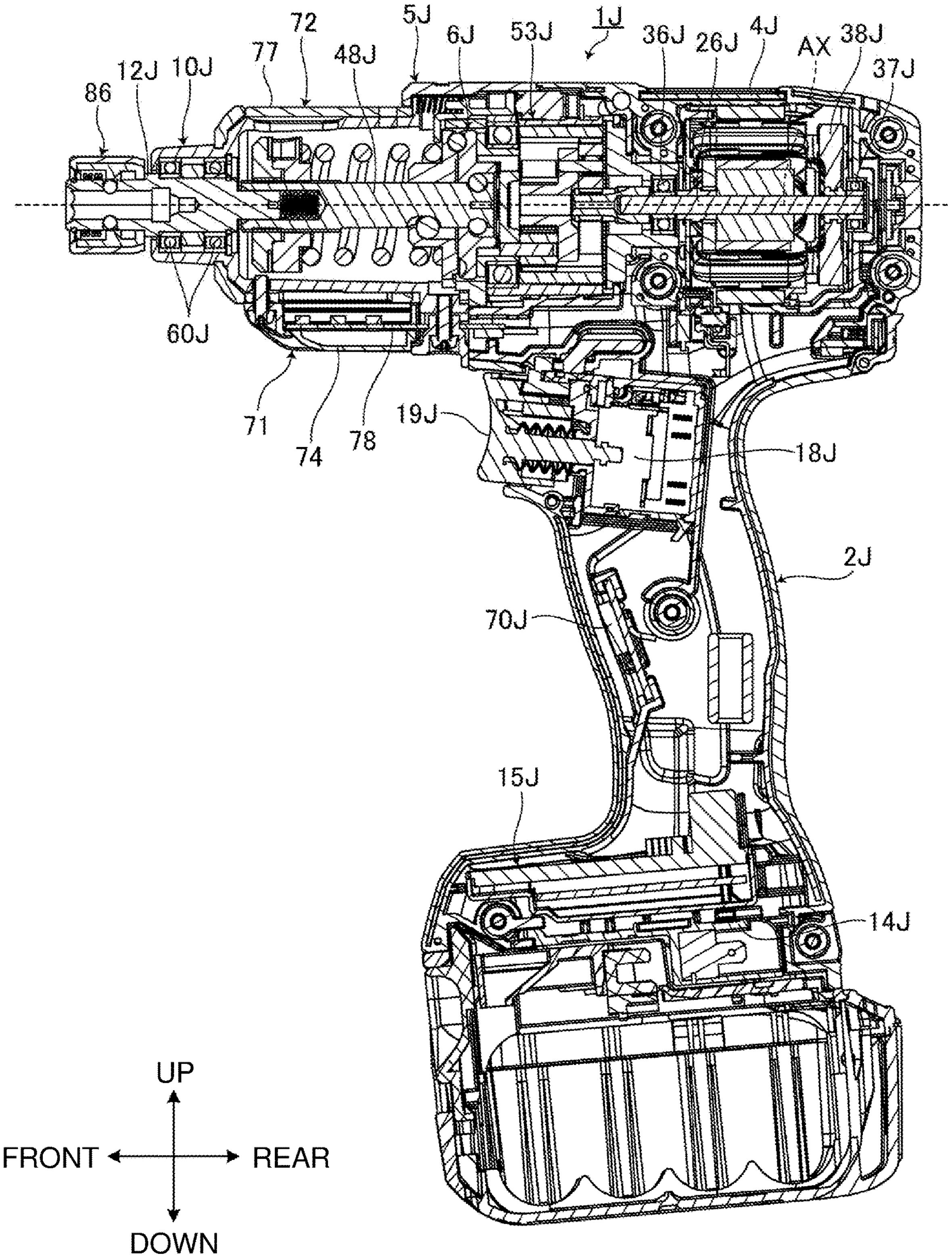
FIG. 33 is a longitudinal sectional view of the electric work machine according to the ninth embodiment.
Figure 34:
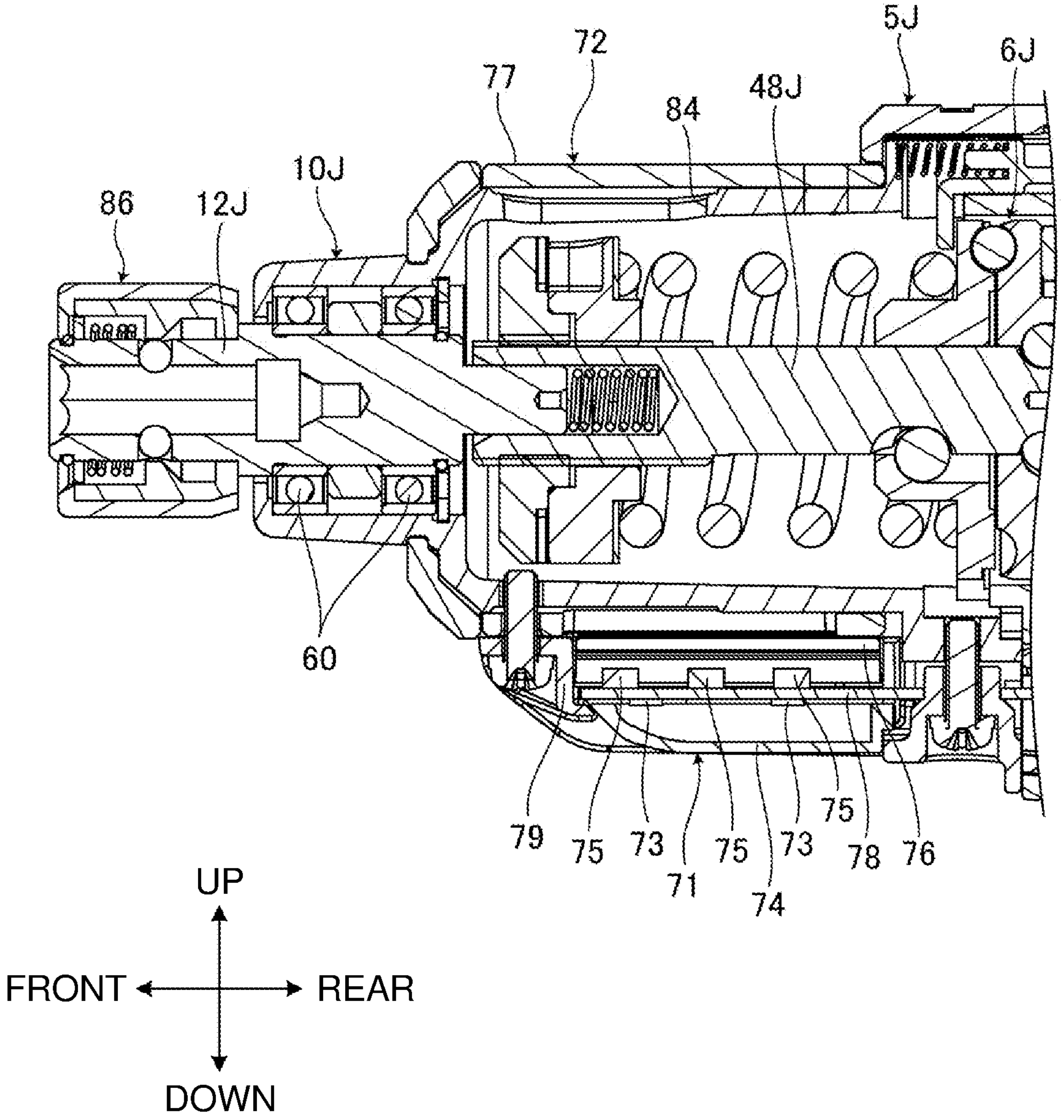
FIG. 34 is a longitudinal sectional view of a front portion of the electric work machine according to the ninth embodiment.

FIG. 31 is a perspective view of an electric work machine 1J according to the present embodiment as viewed from the upper left rear. FIG. 32 is a left view of the electric work machine 1J. FIG. 33 is a longitudinal sectional view of the electric work machine 1J. FIG. 34 is a longitudinal sectional view of a front portion of the electric work machine 1J.

The electric work machine 1 according to each of the above embodiments is an angle screwdriver. As shown in FIGS. 31 to 34, the electric work machine 1J may be a pistol screwdriver. In the electric work machine 1J, a motor 4J has its rotation axis AX aligned with the rotation axis of an output shaft 12J.

The electric work machine 1 includes a main housing 2J, a clutch case 5J, a front housing 10J, a controller 15J, a sound output element 70J, a trigger lever 19J, a forward-reverse switch button 20J, the motor 4J, a reducer 53J, a clutch 6J, a spindle 48J, the output shaft 12J, and a tool holding unit 86.

The main housing 2J includes a motor compartment 3J, a grip 7J, and a battery mount 8J. The grip 7J is located below the motor compartment 3J. The battery mount 8J is located below the grip 7J.

The clutch case 5J is cylindrical and located in front of the motor compartment 3J. The clutch case 5J accommodates the clutch 6J.

The front housing 10J is cylindrical and is located in front of the clutch case 5J. The front housing 10J accommodates at least a part of the output shaft 12J.

A battery pack 13J powers the electric work machine 1J. The battery mount 8J holds a terminal mount 14J electrically connectable to the battery pack 13J.

The controller 15J controls at least the motor 4J. The controller 15J is accommodated in the battery mount 8J.

The trigger lever 19J protrudes frontward from the upper front of the grip 7J. The trigger lever 19J is connected to a trigger switch 18J.

The forward-reverse switch button 20J protrudes laterally from an upper portion of the grip 7J.

The motor 4J is a power source for the electric work machine 1J. The motor 4J is an inner-rotor brushless motor.

A rotor shaft 26J extends in the front-rear direction. The rotor shaft 26J has a front portion supported with a bearing 36J in a rotatable manner. The rotor shaft 26J has a rear portion supported with a bearing 37J in a rotatable manner. A centrifugal fan 38J is fixed to a rear portion of the rotor shaft 26J. The rotor shaft 26J has its front end connected to the reducer 53J.

The clutch 6J moves to change between the engagement state and the release state. In the engagement state, the clutch 6J transmits a rotational force from the motor 4J transmitted through the reducer 53J to the output shaft 12J. In the release state, the clutch 6J blocks transmission of a rotational force from the motor 4J to the output shaft 12J.

The output shaft 12J rotates about a rotation axis extending in the front-rear direction. The output shaft 12J is supported with a bearing 60J in a rotatable manner. The output shaft 12 has its front end protruding frontward from the front housing 10J. The output shaft 12J has a tool hole elongated rearward from the front end of the output shaft 12J. The tool holding unit 86 holds a screwdriver bit placed into the tool hole.

Similarly to the electric work machine 1 described in each of the above embodiments, the electric work machine 1J includes the illumination light emitter 71 and the indication light emitter 72.

Other Embodiments

The electric work machine according to each of the above embodiments is a screwdriver that is an example of a power tool. The electric work machine may be at least one of a driver drill, an angle drill, an impact driver, a grinder, a hammer, a hammer drill, a circular saw, or a reciprocating saw, which is an example of a power tool. The electric work machine may be outdoor power equipment. Examples of the outdoor power equipment include a chain saw, a hedge trimmer, a lawn mower, a mowing machine, and a blower.

In each of the above embodiments, the electric work machine may or may not be powered by the battery pack. The electric work machine may use utility power (alternating current power supply).

REFERENCE SIGNS LIST

1 electric work machine
1J electric work machine
2 main housing
2A left half housing
2B right half housing
2J main housing
3 motor compartment
3J motor compartment
4 motor
4J motor
5 clutch case
5J clutch case
6 clutch
6J clutch
7 grip
7J grip
8 battery mount
8J battery mount
9 screw
10 front housing
10J front housing
11 output unit
12 output shaft
12J output shaft
13 battery pack
13J battery pack
14 terminal mount
14J terminal mount
15 controller
15J controller
16 control circuit board
17 case
18 trigger switch
18J trigger switch
19 trigger lever
19J trigger lever
20 forward-reverse switch button
20J forward-reverse switch button
21 stator
22 rotor
23 stator core
24 insulator
25 coil
26 rotor shaft
26J rotor shaft
27 rotor core
28 permanent magnet
29 sensor permanent magnet
30 sensor circuit board
31 screw
32 terminal unit
33 front wall
34 rear rib
35 bearing holder
36 bearing
36J bearing
37 bearing
37J bearing
38 centrifugal fan
38J centrifugal fan
39 inlet
40 outlet
41 pinion gear
42 internal gear
43 carrier
44 planetary gear
45 rear cam
46 cam ball
47 front cam
48 spindle
48J spindle
49 cam groove
50 ball
51 spring receiver
52 coil spring
53 reducer
53J reducer
54 threaded portion
55 bent cylinder
56 screw sleeve
57 countershaft
58 bevel gear
59 bearing
60 bearing
60J bearing
61 bevel gear
62 sensor board
63 coil spring
64 engagement tab
65 magnet
66 detection substrate
67 detector
68 external connection terminal
69 cover
70 sound output element
70J sound output element
71 illumination light emitter (first light emitter)
72 indication light emitter (second light emitter)
72B indication light emitter
73 light emitter (first light emitter)
74 light-transmissive lens (first lens)
75 light emitter (second light emitter)
76 light-diffusing lens
77 cylindrical lens (second lens)
78 substrate

78C substrate
78D substrate
78E substrate
78F substrate
78G substrate
78H substrate
79 substrate holder
80 screw
81 screw
82 threaded hole
83 threaded hole
84 opening
85 vibration element
86 tool holding unit
741 bent portion
742 flat portion
761 incident surface
762 emission surface
763 incident groove
764 emission groove
771 incident portion
772 opening portion (recess)
772B recess
773 screw through-hole
781 screw through-hole
791 screw through-hole
792 screw through-hole
793 opening
α angle
β angle
Da depth
Db depth
La dimension
Wa dimension

What is claimed is:

1. A screwing tool, comprising:
a motor;
a tool holder rotatable with a rotational force generated by the motor;
a cylindrical lens between the motor and the tool holder; and
a light-emitting element located radially outward from the cylindrical lens and configured to illuminate the cylindrical lens.

2. The screwing tool according to claim 1, wherein
the cylindrical lens has a central axis aligned with a rotation axis of the motor.

3. The screwing tool according to claim 1, wherein
the cylindrical lens has an axial dimension smaller than a radial dimension of the cylindrical lens.

4. The screwing tool according to claim 1, wherein
the cylindrical lens includes an incident portion to receive light from the light-emitting element, and
at least a part of the light received by the incident portion travels inside the cylindrical lens and is output radially outward through an outer circumferential surface of the cylindrical lens.

5. The screwing tool according to claim 4, wherein
the cylindrical lens includes a recess recessed radially inward from the outer circumferential surface of the cylindrical lens, and
the incident portion includes an inner surface of the recess.

6. The screwing tool according to claim 5, wherein
the recess includes an opening portion through the outer circumferential surface and an inner circumferential surface of the cylindrical lens.

7. The screwing tool according to claim 6, wherein
the opening portion is elongated in a direction parallel to a central axis of the cylindrical lens.

8. The screwing tool according to claim 1, wherein
a plurality of the light-emitting elements are arranged in a direction parallel to a central axis of the cylindrical lens.

9. The screwing tool according to claim 8, wherein
the cylindrical lens includes an opening portion through an outer circumferential surface and an inner circumferential surface of the cylindrical lens, and
the opening portion allows light from the plurality of light-emitting elements to be incident on an inner surface of the opening portion.

10. The screwing tool according to claim 9, wherein
at least a part of the light incident on the inner surface of the opening portion travels inside the cylindrical lens and is output radially outward through the outer circumferential surface of the cylindrical lens.

11. The screwing tool according to claim 1, further comprising:
a light-diffusing lens between the light-emitting element and the cylindrical lens.

12. The screwing tool according to claim 11, wherein
the light-diffusing lens includes
an incident groove on an incident surface facing the light-emitting element, and
an emission groove on an emission surface facing the cylindrical lens, and
at least a part of light incident on the incident groove from the light-emitting element is emitted through the emission groove before being incident on the cylindrical lens.

13. The screwing tool according to claim 12, wherein
the incident groove and the emission groove are elongated in a direction parallel to a central axis of the cylindrical lens.

14. The screwing tool according to claim 13, wherein
each of the incident groove and the emission groove includes a triangular groove, and
the incident groove has an angle smaller than an angle of the emission groove in a cross section perpendicular to the central axis.

15. The screwing tool according to claim 13, wherein
the incident groove has a depth greater than a depth of the emission groove.

16. The screwing tool according to claim 1, further comprising:
a clutch between the motor and the tool holder; and
a clutch case accommodating the clutch,
wherein the cylindrical lens surrounds the clutch case.

17. The screwing tool according to claim 16, wherein
the cylindrical lens is supported by the clutch case in a rotatable manner.

18. The screwing tool according to claim 17, wherein
the clutch case includes an opening to receive a tool to adjust the clutch, and
the cylindrical lens is rotatable to cover or uncover the opening.

19. The screwing tool according to claim 18, further comprising:
a screw fastening the cylindrical lens to the clutch case with the opening covered by the cylindrical lens.

20. The screwing tool according to claim 19, further comprising:
a substrate supporting the light-emitting element; and
a substrate holder holding the substrate, wherein the substrate holder and the cylindrical lens are fastened to the clutch case with the screw.

* * * * *